United States Patent
Holmquist et al.

(10) Patent No.: US 12,461,318 B2
(45) Date of Patent: Nov. 4, 2025

(54) FIBER OPTIC CONNECTOR WITH OVERMOLD LEAD-IN TUBE

(71) Applicant: COMMSCOPE TECHNOLOGIES LLC, Hickory, NC (US)

(72) Inventors: Marlon E. Holmquist, St. Peter, MN (US); David Donald Erdman, Hummelstown, PA (US); Steven Conrad Zimmel, Minneapolis, MN (US)

(73) Assignee: CommScope Technologies LLC, Claremont, NC (US)

( * ) Notice: Subject to any disclaimer, the term of this patent is extended or adjusted under 35 U.S.C. 154(b) by 938 days.

(21) Appl. No.: 17/627,519

(22) PCT Filed: Jul. 14, 2020

(86) PCT No.: PCT/US2020/041955
§ 371 (c)(1),
(2) Date: Jan. 14, 2022

(87) PCT Pub. No.: WO2021/011549
PCT Pub. Date: Jan. 21, 2021

(65) Prior Publication Data
US 2022/0269014 A1  Aug. 25, 2022

Related U.S. Application Data

(60) Provisional application No. 62/875,332, filed on Jul. 17, 2019.

(51) Int. Cl.
G02B 6/38 (2006.01)

(52) U.S. Cl.
CPC ......... G02B 6/3865 (2013.01); G02B 6/3825 (2013.01); G02B 6/3843 (2013.01); G02B 6/3869 (2013.01)

(58) Field of Classification Search
CPC .. G02B 6/3865; G02B 6/3825; G02B 6/3843; G02B 6/3869; G02B 6/3861; G02B 6/3833
See application file for complete search history.

(56) References Cited

U.S. PATENT DOCUMENTS 5,058,984 A  10/1991 Bulman et al.
5,096,276 A  3/1992 Gerace et al.
(Continued)

FOREIGN PATENT DOCUMENTS

CN 101091131 A 12/2007
CN 104169764 A 11/2014
(Continued)

OTHER PUBLICATIONS

Extended European Search Report for Application No. 20841353.4 mailed Jul. 14, 2023.
(Continued)

*Primary Examiner* — Leslie C Pascal
(74) *Attorney, Agent, or Firm* — Merchant & Gould P.C.

(57) ABSTRACT

The present disclosure relates to a fiber optic connector designed to improve the insertion of an optical fiber within the fiber optic connector. The fiber optic connector may include a lead-in tube that makes the insertion of an optical fiber easier. That is, the lead-in tube may be molded over a ferrule hub to fully encapsulate a rear end thereof such that the optical fiber does not snag or hang up during insertion.

11 Claims, 29 Drawing Sheets

(56) References Cited

U.S. PATENT DOCUMENTS

| | | |
|---|---|---|
| 5,181,267 A | 1/1993 | Gerace et al. |
| 5,317,663 A | 5/1994 | Beard et al. |
| 5,375,183 A | 12/1994 | Edwards et al. |
| 5,428,703 A | 6/1995 | Lee |
| 5,611,012 A | 3/1997 | Kuchenbecker |
| 5,682,451 A | 10/1997 | Lee et al. |
| 5,778,126 A | 7/1998 | Saitoh |
| 6,142,676 A | 11/2000 | Lu |
| 6,155,146 A | 12/2000 | Andrews et al. |
| 6,629,782 B2 | 10/2003 | McPhee et al. |
| 7,281,859 B2 | 10/2007 | Mudd et al. |
| 7,997,806 B2 | 8/2011 | Nakagawa |
| 8,496,386 B2 | 7/2013 | Kerr et al. |
| 8,858,090 B2 | 10/2014 | Henke et al. |
| 9,057,849 B2 | 6/2015 | Park et al. |
| 9,684,138 B2 | 6/2017 | Lu |
| 11,150,412 B2 | 10/2021 | Zimmel et al. |
| 11,187,859 B2 | 11/2021 | Rosson et al. |
| 2002/0081077 A1 | 6/2002 | Nault |
| 2003/0147598 A1 | 8/2003 | McPhee et al. |
| 2004/0151437 A1 | 8/2004 | Marrs et al. |
| 2005/0232553 A1 | 10/2005 | Holmquist |
| 2005/0232554 A1 | 10/2005 | Zimmel et al. |
| 2006/0115219 A1 | 6/2006 | Mudd et al. |
| 2007/0183721 A1 | 8/2007 | Holmquist et al. |
| 2009/0214164 A1 | 8/2009 | Nakagawa |
| 2011/0008003 A1 | 1/2011 | Tamekuni et al. |
| 2011/0075972 A1 | 3/2011 | Parkman, III |
| 2013/0089294 A1 | 4/2013 | Zimmel |
| 2013/0315541 A1 | 11/2013 | Nhep et al. |
| 2013/0322826 A1 | 12/2013 | Henke et al. |
| 2017/0212313 A1* | 7/2017 | Elenabaas ............ G02B 6/3821 |
| 2018/0059334 A1 | 3/2018 | Lu et al. |
| 2018/0224608 A1 | 8/2018 | Liu et al. |
| 2022/0260788 A1 | 8/2022 | Zimmel et al. |
| 2022/0276451 A1 | 9/2022 | Zimmel et al. |
| 2022/0357523 A1 | 11/2022 | Zimmel et al. |

FOREIGN PATENT DOCUMENTS

| | | | |
|---|---|---|---|
| CN | 109716194 A | | 5/2019 |
| JP | 2010256703 A | * | 11/2010 ............ G02B 6/3869 |
| WO | 2014/031556 A1 | | 2/2014 |

OTHER PUBLICATIONS

Partial Supplementary European Search Report for Application No. 20840593.6 mailed Jul. 4, 2023.

International Search Report and Written Opinion of the International Searching Authority for International Patent Application No. PCT/US2020/041955 mailed Nov. 5, 2020, 14 pages.

International International Search Report and Written Opinion of the International Searching Authority for International Patent Application No. PCT/US2020/042135 mailed Nov. 5, 2020, 9 pages.

International International Search Report and Written Opinion of the International Searching Authority for International Patent Application No. PCT/US2020/42152 mailed Nov. 6, 2020, 9 pages.

International International Search Report and Written Opinion of the International Searching Authority for International Patent Application No. PCT/US2020/042368 mailed Nov. 5, 2020, 10 pages.

Extended European Search Report for Application No. 20840593.6 mailed Oct. 9, 2023.

* cited by examiner

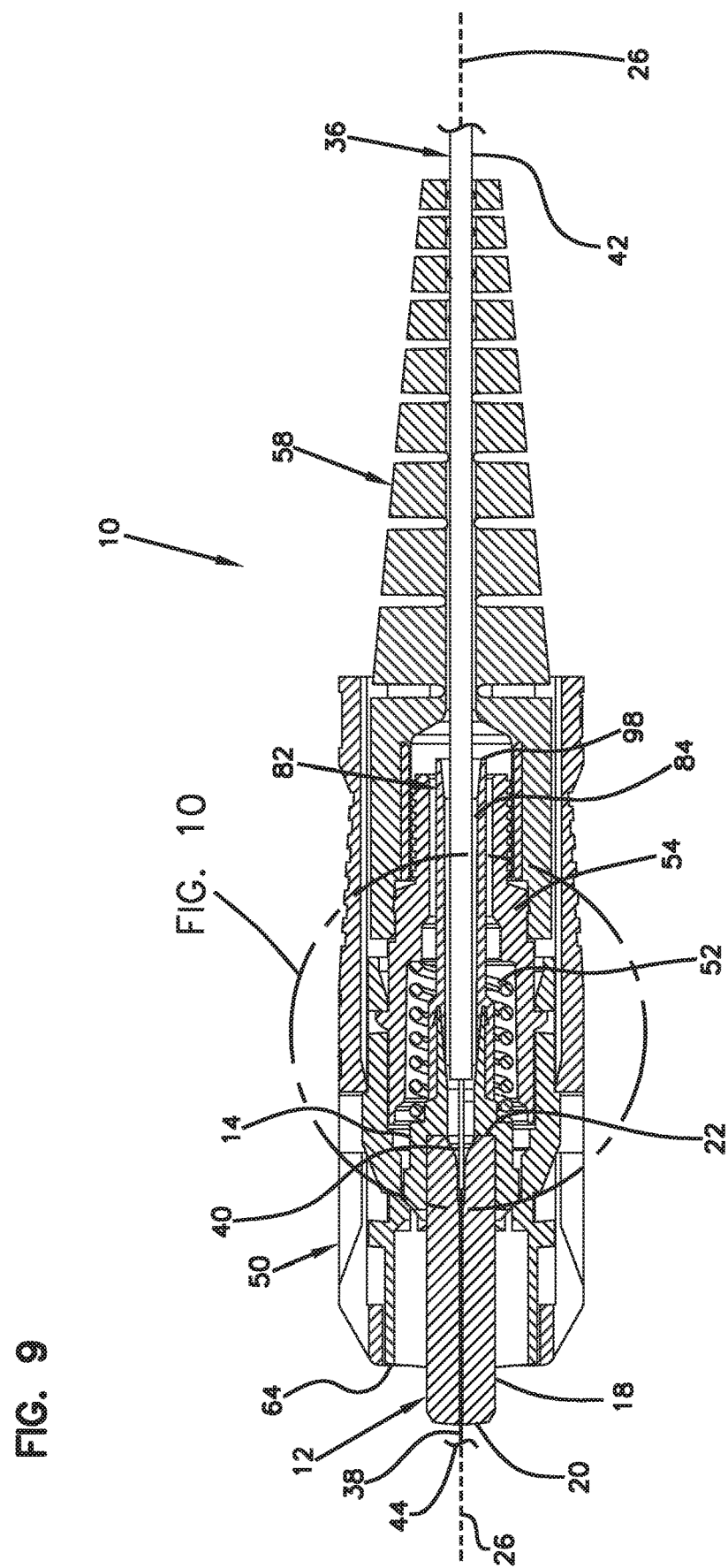

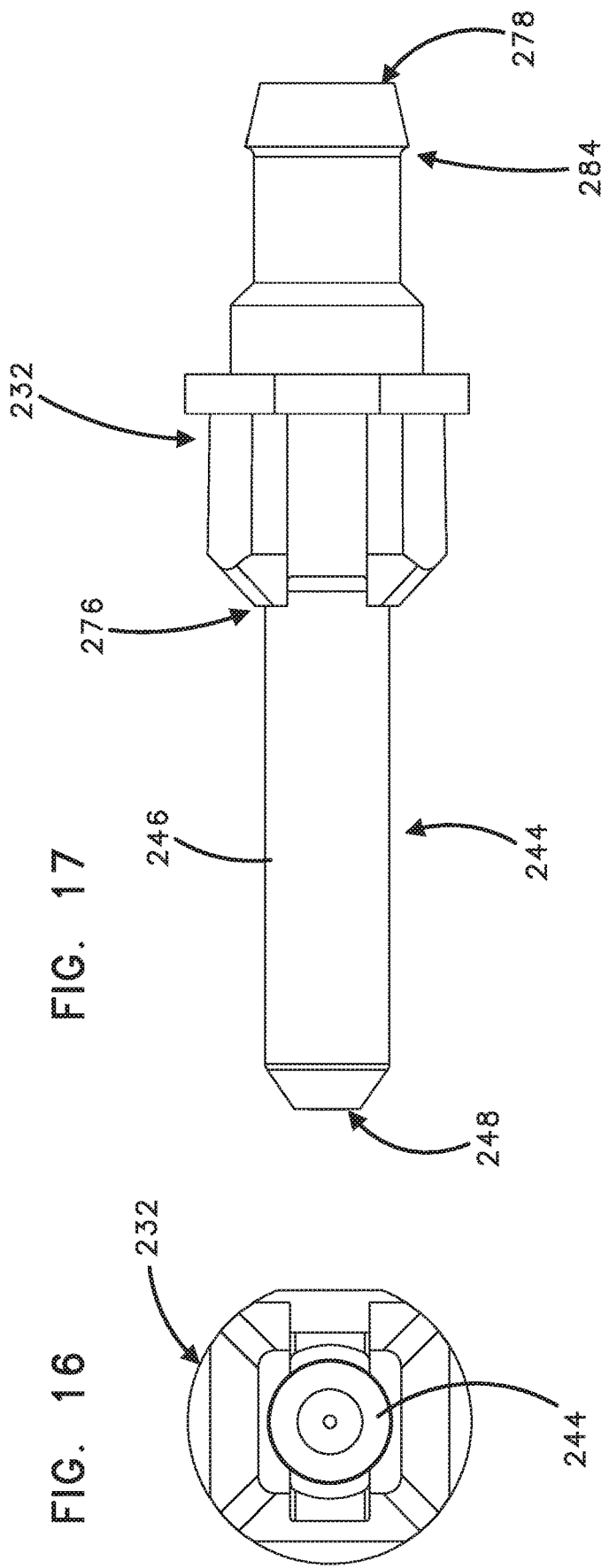

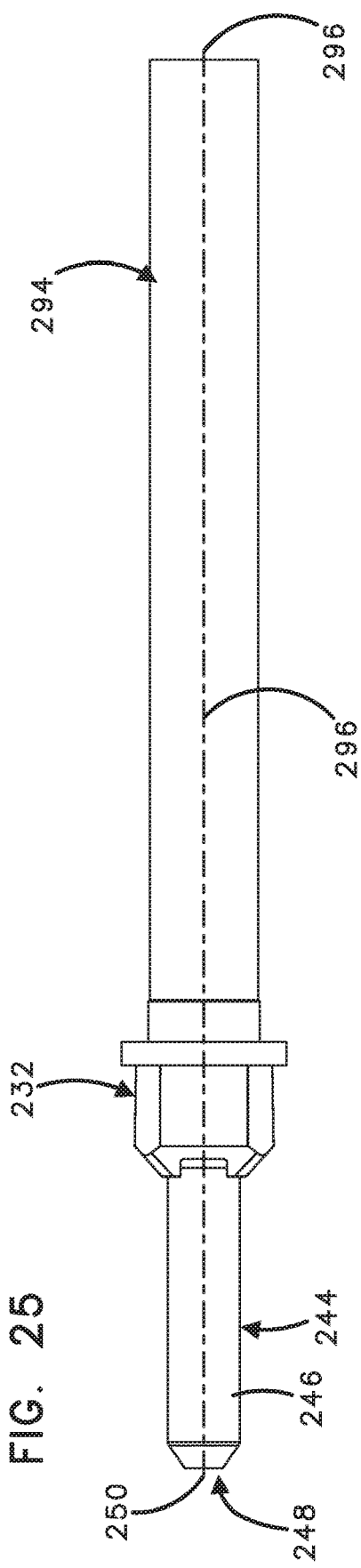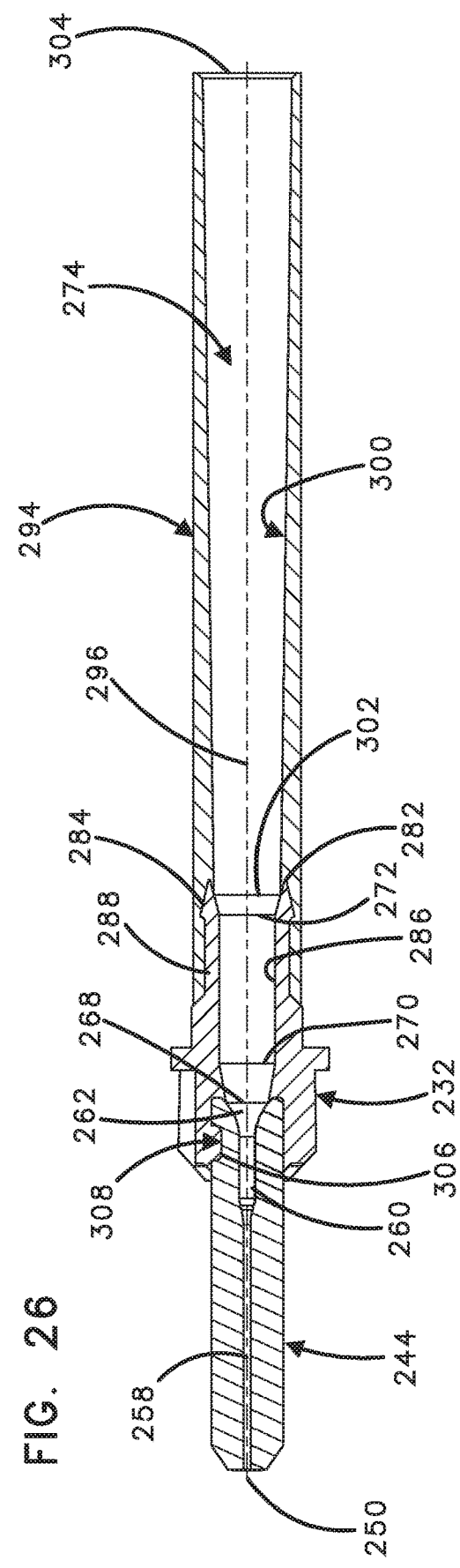

FIBER OPTIC CONNECTOR WITH OVERMOLD LEAD-IN TUBE

CROSS-REFERENCE TO RELATED APPLICATION

This application is a National Stage Application of PCT/US2020/041955, filed on Jul. 14, 2020, which claims the benefit of U.S. Patent Application Ser. No. 62/875,332, filed on Jul. 17, 2019, the disclosures of which are incorporated herein by reference in their entireties. To the extent appropriate, a claim of priority is made to each of the above disclosed applications.

TECHNICAL FIELD

The disclosure relates to fiber optic connectors for use in optical fiber signal transmission systems and, more particularly, to an over-mold lead-in tube.

BACKGROUND

Fiber optic communication systems are becoming prevalent in part because service providers want to deliver high bandwidth communication capabilities (e.g., data and voice) to customers. Fiber optic communication systems employ a network of fiber optic cables to transmit large volumes of data and voice signals over relatively long distances. Optical fiber connectors are an important part of most fiber optic communication systems. Fiber optic connectors allow two optical fibers to be quickly optically connected without requiring a splice. Fiber optic connectors can be used to optically interconnect two lengths of optical fiber. Fiber optic connectors can also be used to interconnect lengths of optical fiber to passive and active equipment. Fiber optic connectors can include single fiber connectors and multi-fiber connectors.

When two fiber optic connectors are interconnected, their respective optical fibers are coaxially aligned such that the end faces of the optical fibers directly oppose one another. In this way, an optical signal can be transmitted from optical fiber to optical fiber through the aligned end faces of the optical fibers.

Lead-in tubes may be used in fiber optic connectors to help with epoxy insertion. Lead-in tubes may also be to help with fiber insertion. Improvements are desirable with respect to the design of lead-in tubes.

SUMMARY

Aspects of the present disclosure relate to a fiber optic connector designed to improve the insertion of an optical fiber within the fiber optic connector. In certain applications, an optical fiber may encounter obstructions while being inserted into a fiber optic connector to hamper proper insertion. For example, exposed ridges on a lead-in tube, a ferrule, and a hub may interfere and stop forward progress of the optical fiber. Such interference may also cause damage to the optical fiber.

Lead-in tubes also help with preventing epoxy migration or epoxy placement in undesired locations outside of the area where the optical fiber is joined to the ferrule of the fiber optic connector, such as in the spring area of the connector.

One aspect of the present disclosure relates to a fiber optic connector designed with a lead-in tube that makes the insertion of an optical fiber easier. The lead-in tube may be molded over a ferrule hub to fully encapsulate a rear end thereof such that the optical fiber does not snag or hang up during insertion.

In certain examples, the over-molded lead-in tube tapers to zero along a tapered inner surface portion of a ferrule hub.

The fiber optic connector preferably includes an over-molded lead-in tube constructed of a flexible plastic material more flexible than the hub.

The fiber optic connector can be an SC-type fiber optic connector or an LC-type fiber optic connector.

The fiber optic connector in one example can have the over-molded lead-in tube taper to zero along a tapered inner surface portion of the hub and define a needle shut off zone on the tapered inner surface downstream of the location where the lead-in tube tapers to zero.

The fiber optic connector in one example can have an over-mold retention member. In one example, the retention member is defined by a circumferentially extending member, preferably a barb.

The fiber optic connector in one example can have an over-molded lead-in tube taper to zero along a tapered inner surface portion of the hub, and the same tapered inner surface of the hub can define a mold pin shut off zone which forms the taper to zero, and a needle shut off zone on the tapered inner surface downstream of the location where the lead-in tube tapers to zero.

A tapered inner surface portion of the ferrule hub may have an angle of 20 degrees or less relative to a central axis of a fiber optic connector. In certain examples, the taper is 10 degrees or less, such as for an SC connector. In certain examples, the taper is 6 degrees or less, such as for an SC connector. In one example SC connector an angle of 5.5 degrees in provided. In certain examples the taper is 16 degrees or less, such as for an LC connector. In one example LC connector an angle of 15 degrees in provided.

In certain examples, the over-molded lead-in tube may have an inside taper angle of less than 5 degrees relative to the central axis, and in some cases 1 degree or less.

A variety of additional aspects will be set forth in the description that follows. The aspects relate to individual features and to combinations of features. It is to be understood that both the foregoing general description and the following detailed description are exemplary and explanatory only and are not restrictive of the broad inventive concepts upon which the embodiments disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows:

FIG. 9 is a cross-sectional view of the fiber optic connector of FIG. 3 and includes a fiber optic cable inserted into an inner passage through the ferrule;

FIG. 16 is an end view of a ferrule hub including a ferrule in accordance with the principles of the present disclosure;

FIG. 17 is a side view of the ferrule hub and the ferrule of FIG. 16;

FIG. 25 is a side view of the ferrule hub and the ferrule including the epoxy tube of FIG. 24;

FIG. 26 is a cross-sectional view of the ferrule hub, ferrule and epoxy tube of FIG. 25;

DETAILED DESCRIPTION

Aspects of the present disclosure will be described more fully hereinafter with reference to the accompanying drawings, in which illustrative embodiments are shown. This disclosure may, however, be embodied in many different forms and should not be construed as limited to the embodiments set forth herein; rather, these embodiments are provided so that this disclosure will be thorough and complete, and will fully convey the scope of the invention to those skilled in the art.

Referring to FIGS. 1-10, an example fiber optic connector 10, including a fiber optic ferrule 12 and a hub 14, is shown. The hub 14 is shown mounted to the fiber optic ferrule 12 of the fiber optic connector 10. In certain examples, the hub 14 is a plastic material that is overmolded onto the fiber optic ferrule 12. The fiber optic ferrule 12 and the hub 14 can be secured together by convenient methods including press fit or adhesive mounts. The fiber optic ferrule 12 and the hub 14 are mounted within a connector housing 16, shown at FIGS. 5-6.

Figure 11:
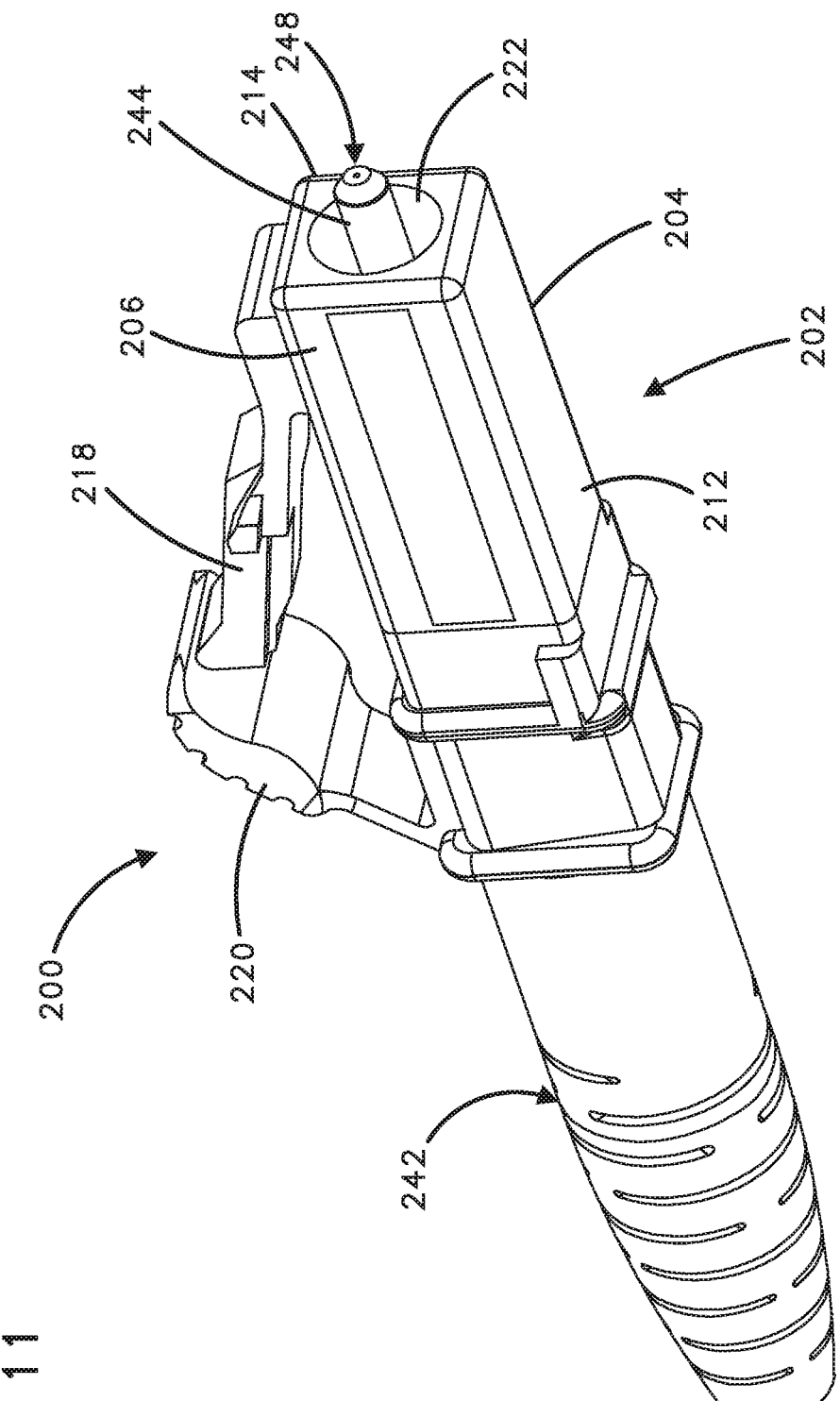
FIG. 11 is a front perspective view of another example fiber optic connector in accordance with the principles of the present disclosure.
Figure 12:
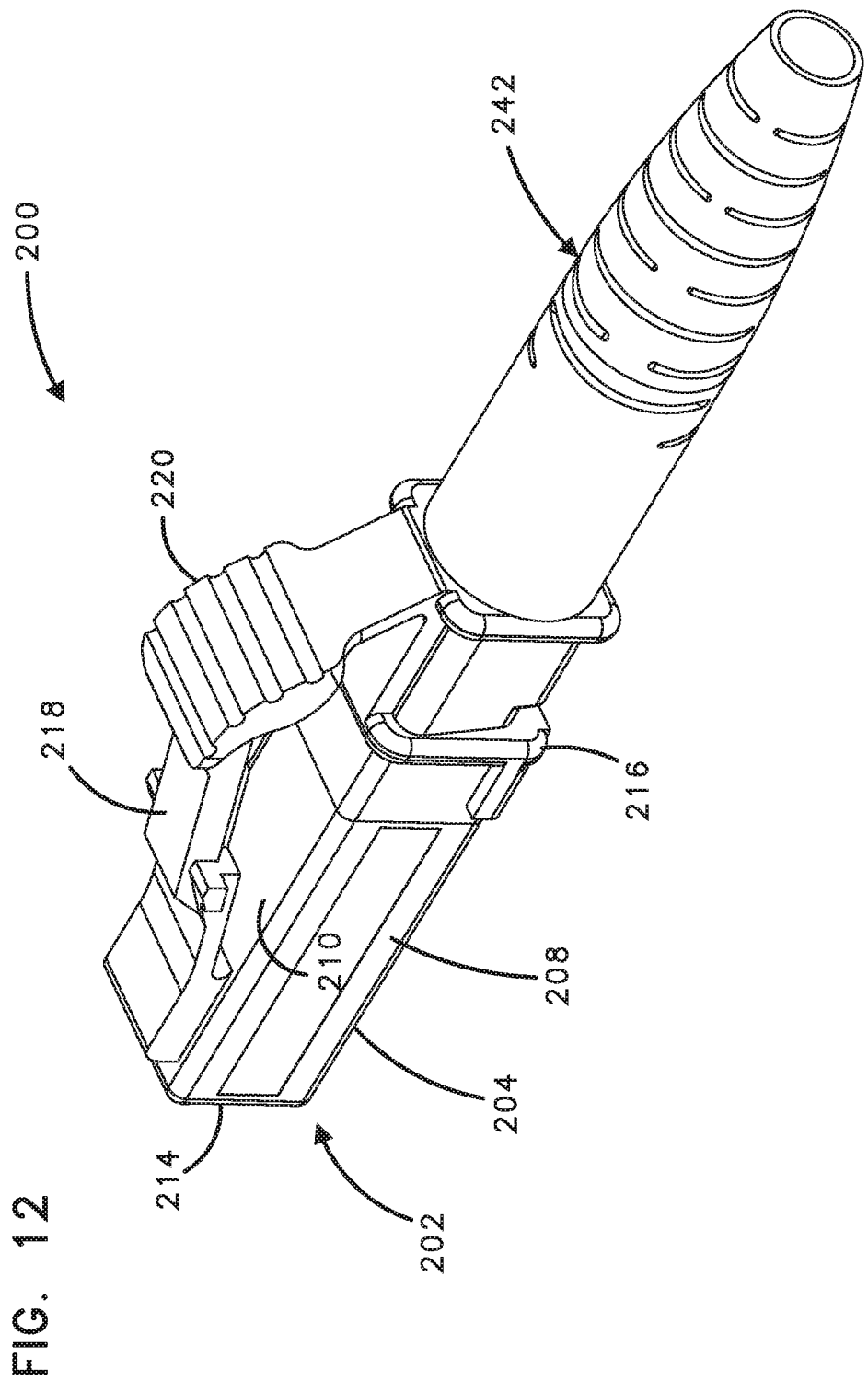
FIG. 12 is a rear perspective view of the fiber optic connector of FIG. 11.
Figure 13:
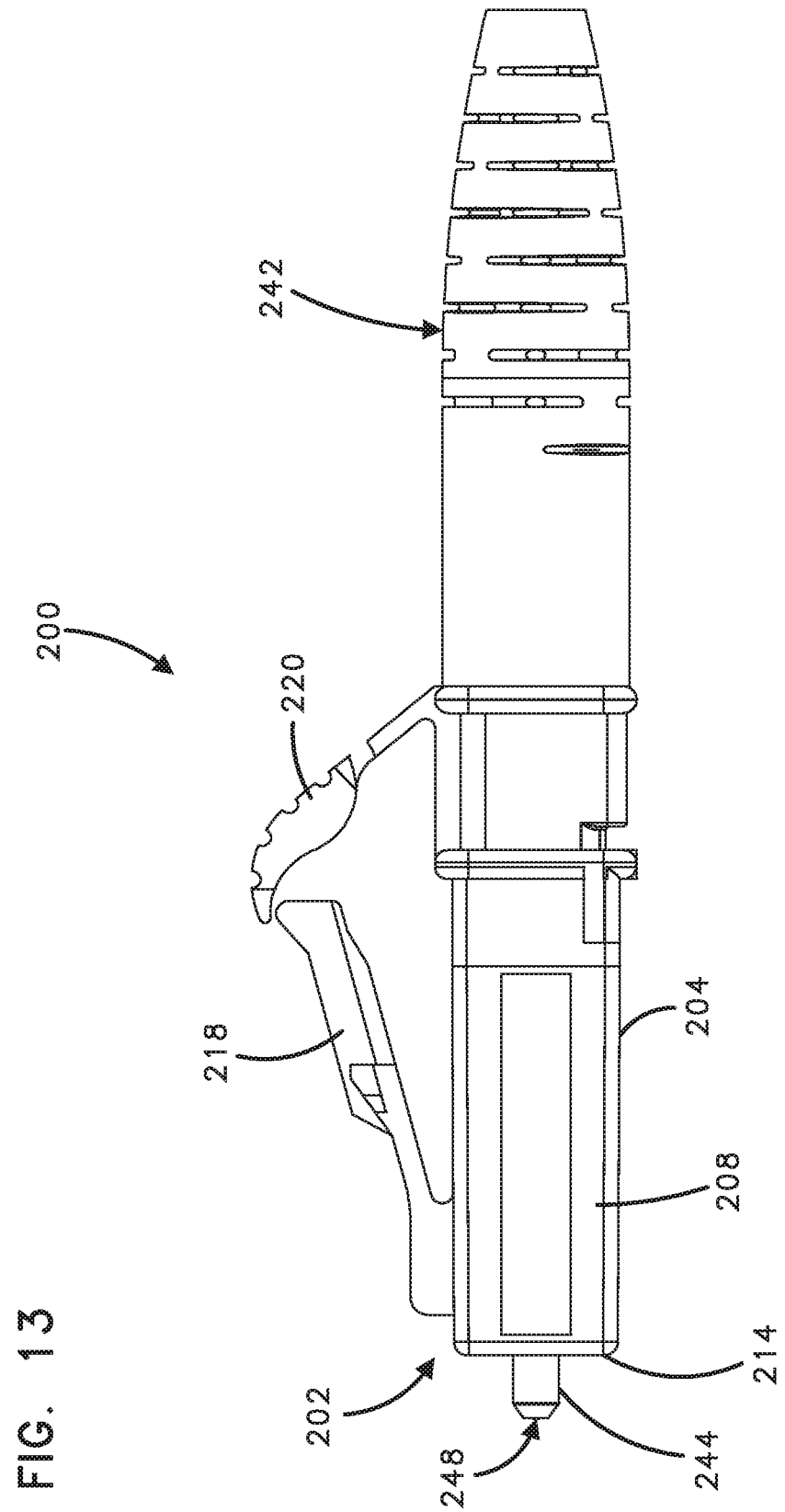
FIG. 13 is a side view of the fiber optic connector of FIG. 11.
Figure 14:
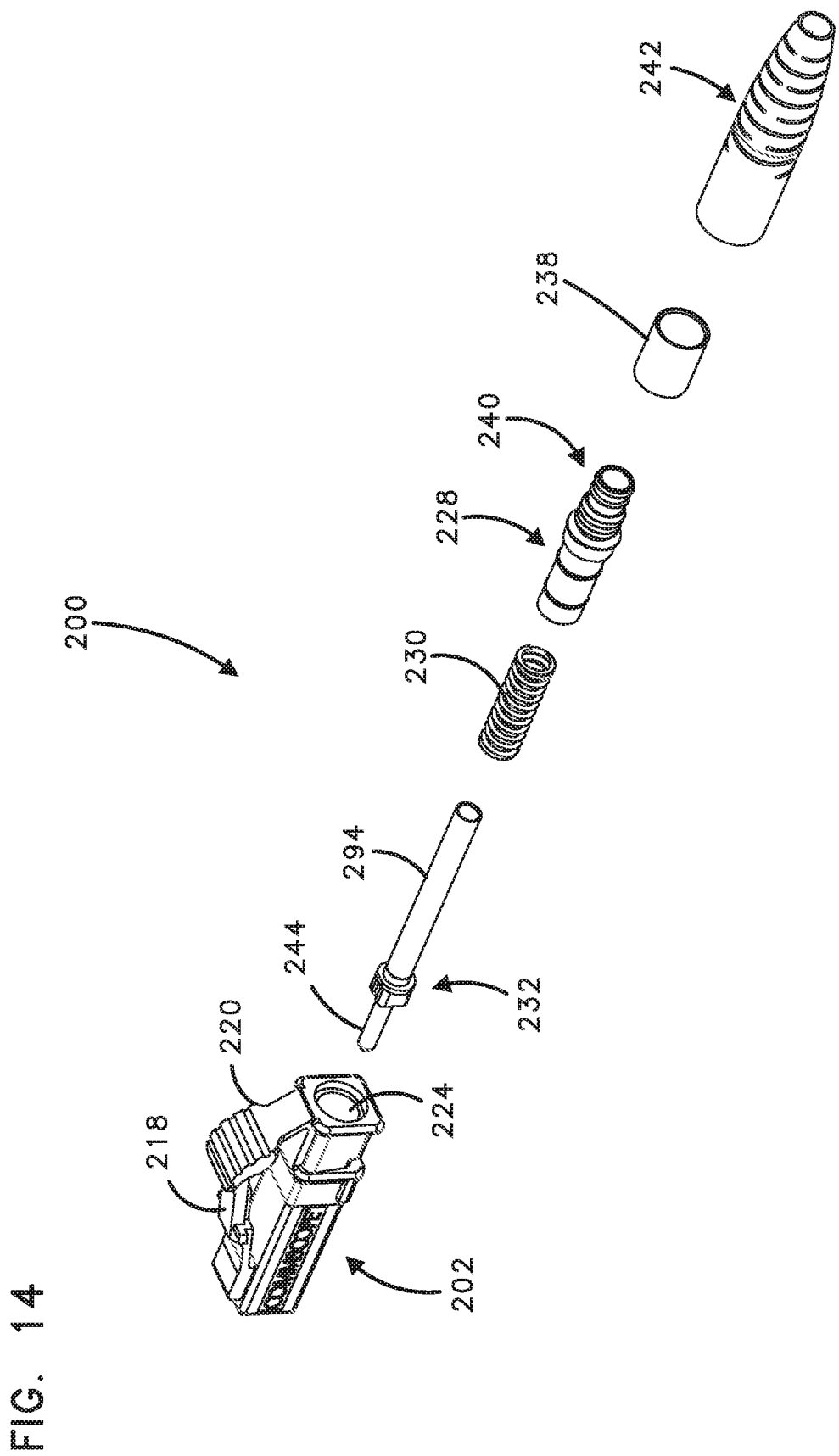
FIG. 14 is an exploded view of the fiber optic connector of FIG. 12.
Figure 15:
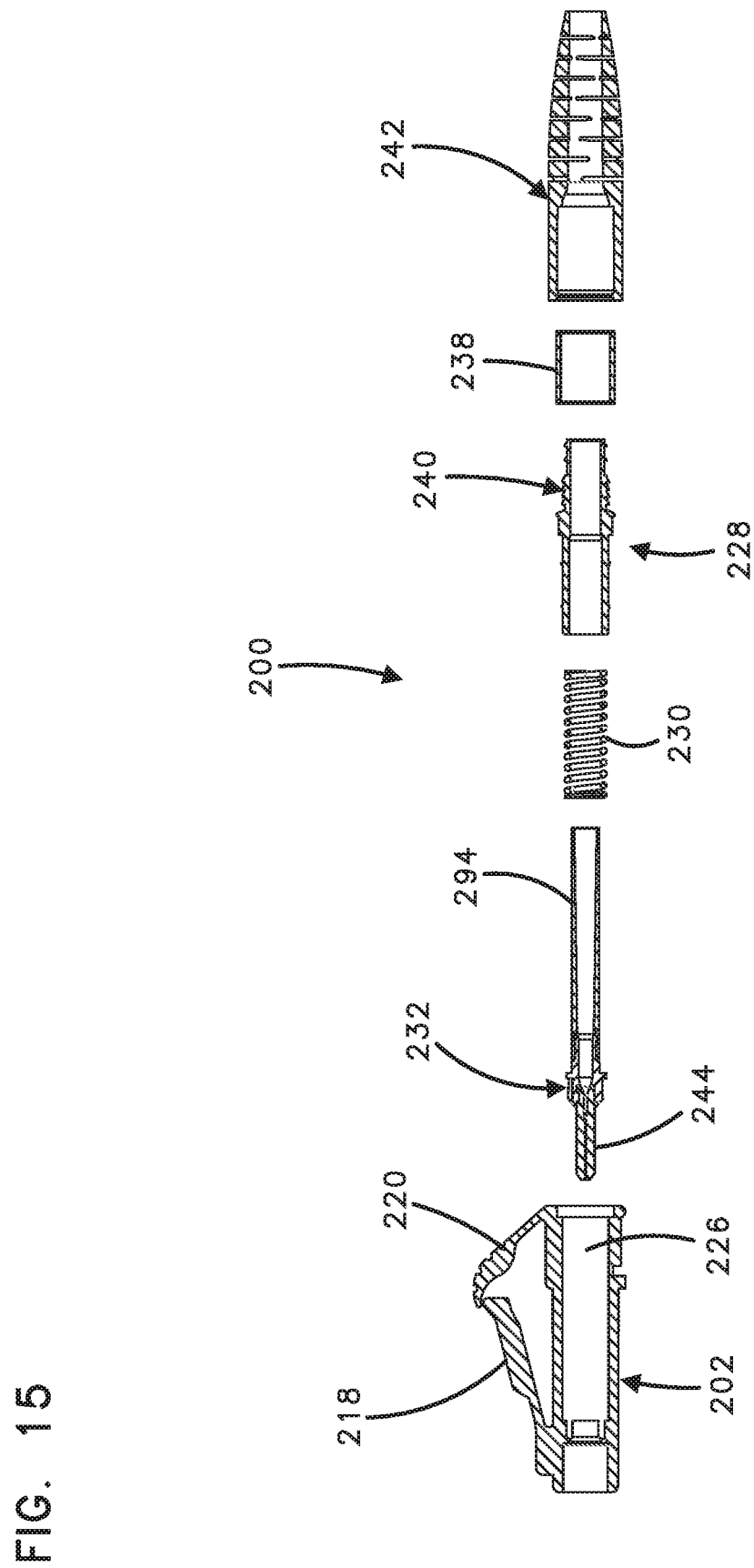
FIG. 15 is a cross-sectional side view of the fiber optic connector of FIG. 14.

In the depicted example, the connector housing 16 is an SC type connector housing, and the fiber optic connector 10 is an SC type fiber optic connector. In other examples, the fiber optic connector 10 can be one of a variety of well-known connector types, including LC as depicted in FIG. 11, and others.

The fiber optic ferrule 12 includes a body 18 with a first end 20 defining a ferrule tip. The body 18 of the fiber optic ferrule 12 includes an opposite end 22 received in a pocket 24 of the hub 14. The fiber optic ferrule 12 includes a central axis 26. The first end 20 of the fiber optic ferrule 12 is typically polished along with the fiber after the fiber is installed. The body 18 of the fiber optic ferrule 12 is typically ceramic in construction, although alternatives are possible. In one example, the ferrule 12 and the hub 14 can be made of Ultem, thermoplastic materials such as Polyphenylene sulfide (PPS), other engineering plastics or various metals. Other materials and molding processes may be used. In other examples, the fiber optic ferrule 12 may be made of metal.

The fiber optic ferrule 12 includes a central passage 28 concentric with the central axis 26. The central passage 28 extends from the first end 20 to the opposite second end 22. The central passage 28 includes a first portion 30 having a first diameter, an intermediate or second portion 32 having a second diameter, and a rear or third portion 34. The first portion 30 is sized to receive an inner fiber sized at 125 microns. The second portion 32 is sized to receive a portion of a fiber optic cable including an outer coating at 250 microns. That is, the fiber optic ferrule 12 includes dual diameter portions 30, 32, each specially sized to receive an inner fiber (125 microns) and a portion of an outer coating (250 microns), respectively.

The third portion 34 is tapered inward from the opposite end 22 so as to facilitate insertion of the fiber during installation. The third portion 34 may include a transition area that extends from a first end 102 (see FIG. 8) that abuts with the second portion 32 to a second end 104 (see FIG. 8) that abuts with the second end 22 of the fiber optic ferrule 12 adjacent to the first bore end 90 (see FIG. 8) of an upper bore section 88 of the hub 14. The transition area has an inner diameter ID that continuously changes between the first end 102 and the second end 104.

While a single fiber ferrule is depicted, aspects of the present disclosure are also applicable to multi-fiber ferrules such as MT-ferrules and MPO ferrules. A typical multi-fiber ferrule can have a generally rectangular shape and can support a plurality of optical fibers supported in one or more rows by the multi-fiber ferrule.

Figure 10:
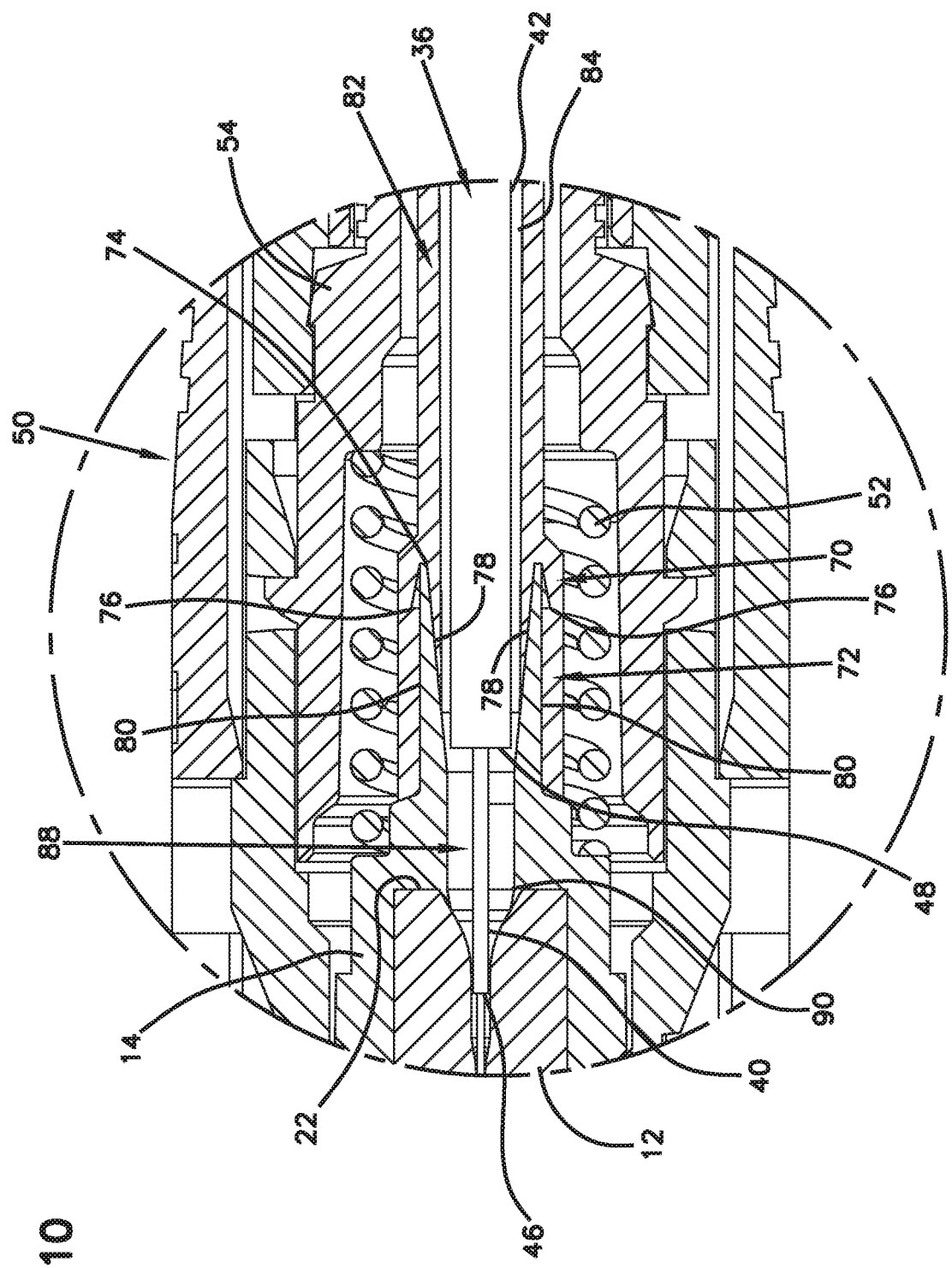
FIG. 10 is an enlarged view of a portion of FIG. 9.

Referring now to FIGS. 9 and 10, a fiber optic cable 36 is shown with an inner fiber 38, an outer coating 40, and a buffer layer 42. The inner fiber 38 terminates at an end 44. Typically, the end 44 is removed and polished with the first end 20 of the fiber optic ferrule 12. The outer coating 40 terminates at end 46. The buffer layer 42 terminates at end 48. The fiber optic ferrule 12 closely surrounds the inner fiber 38, and the outer coating 40. Epoxy is used within the central passage 28 to adhesively hold the fiber optic cable 36 to the fiber optic ferrule 12.

In the fiber optic ferrule 12, first portion 30 has a first dimension $D_1$ (see FIG. 8) sized large enough to receive the uncoated fiber, but not so large as to receive the coated fiber. The second portion 32 has a second dimension $D_2$ (see FIG. 8) large enough to receive the coated fiber, but not so large as to receive the buffer.

In certain examples, the first portion 30 is cylindrically shaped and sized at 0.1255 mm+/−0.0015 mm to receive the inner fiber 38 sized at 125 microns. The second portion 32 is cylindrically shaped and sized at 0.260 mm+/−0.010 mm to receive the portion of the cable including the outer coating 40 at 250 microns. A preferred range for the second portion 32 is greater than 250 microns, and less than or equal to 500 microns. A more preferred range for the second portion 32 is greater than 250 microns, and less than or equal to 300 microns. The buffer layer 42 may have an outer diameter of, for example, about 900 microns and further protects the fiber.

Although a single optical fiber is depicted, it will be appreciated that more than one optical fiber may be located within the buffer layer, such as two, four, eight, or even up to twenty four optical fibers. The optical fiber may be positioned loosely within the buffer layer to provide a "loose-tube" arrangement or may be positioned to provide a "tight-tube" arrangement.

The fiber optic cable 36 may include a plurality of inner strength members. In one example, the plurality of strength members are fibers or yarns that completely surround the buffer layer 42. The yarns may be constructed of aramid yarns, such as those sold under the trademark of Kevlar. In certain examples, the fiber optic cable 36 includes at least one rigid strength member within the inner core.

Figure 1:
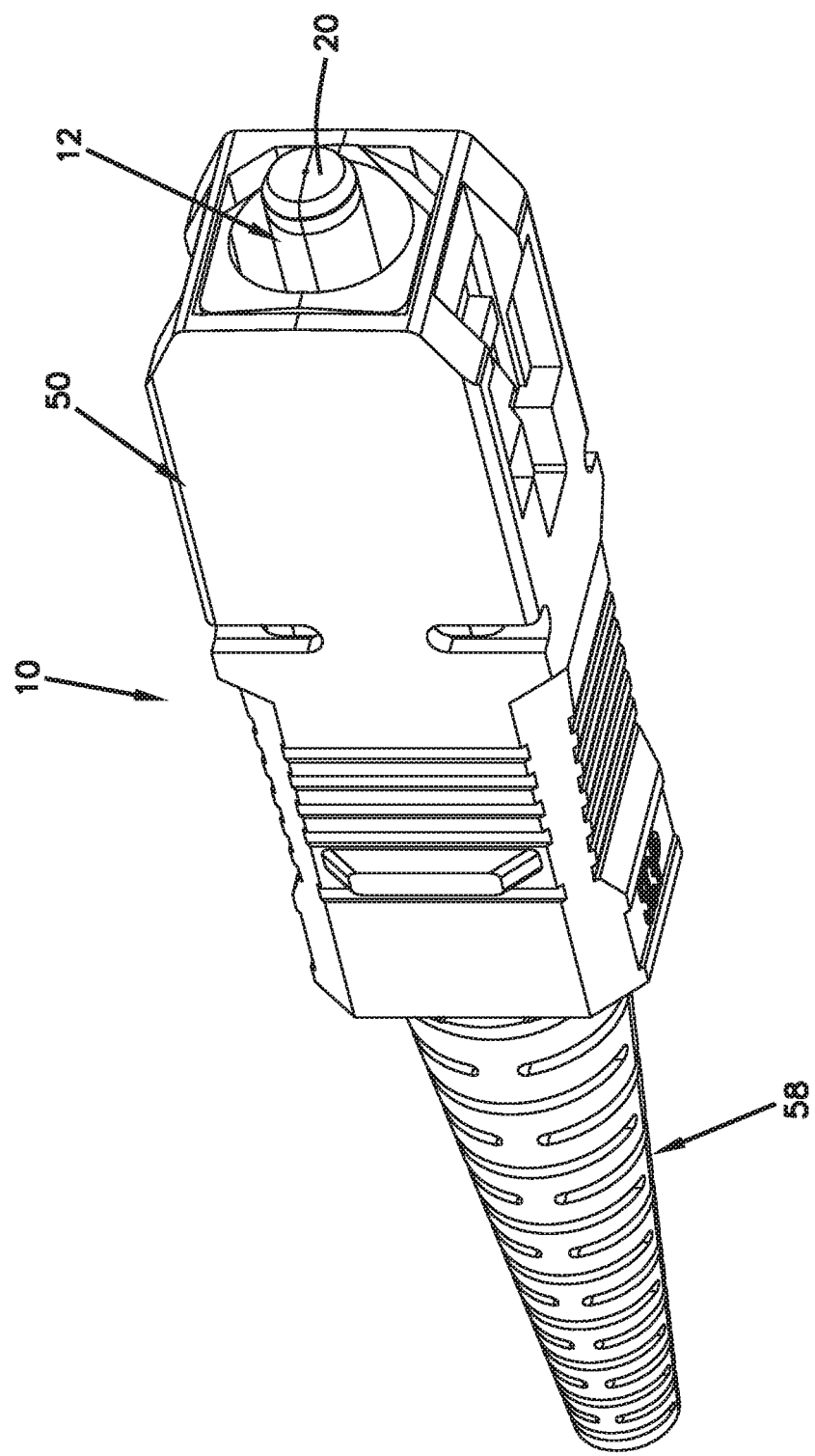
FIG. 1 is a front perspective view of an example fiber optic connector including a ferrule and a hub in accordance with principles of the present disclosure.
Figure 2:
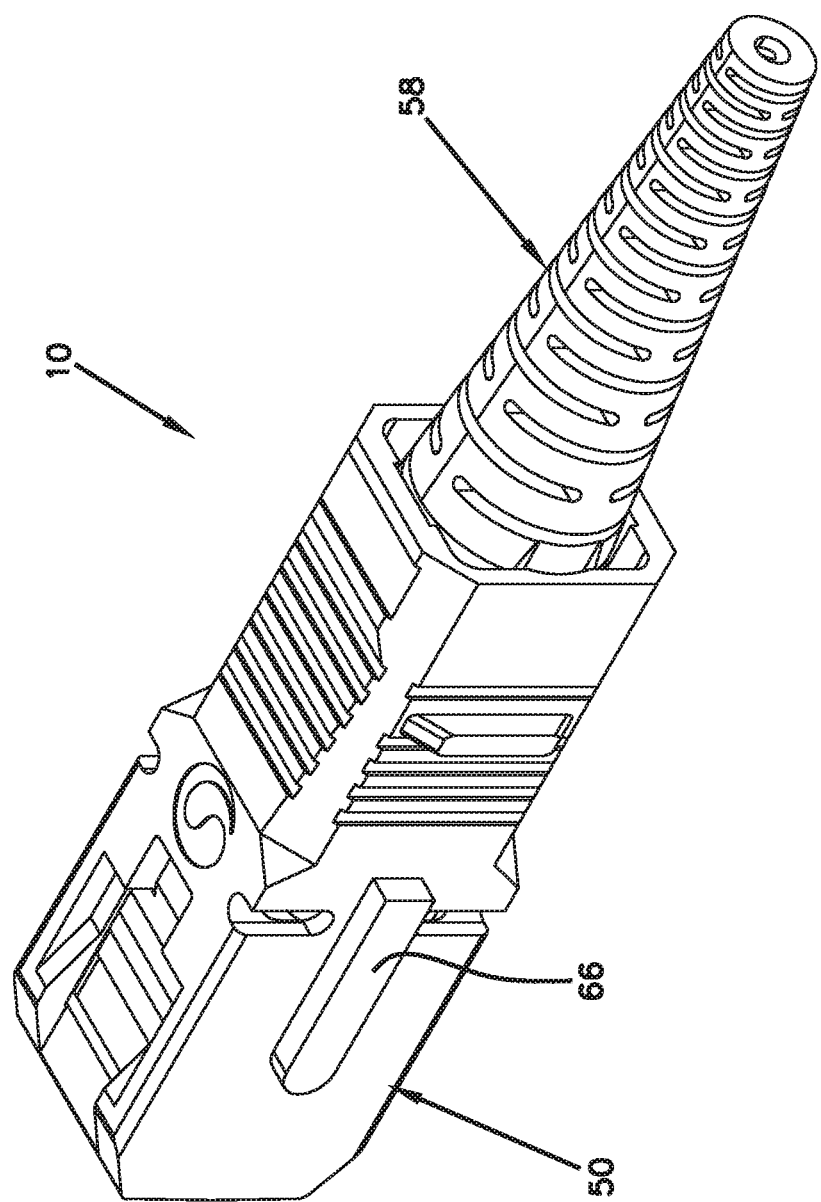
FIG. 2 is a rear perspective view of the fiber optic connector of FIG. 1.
Figure 3:
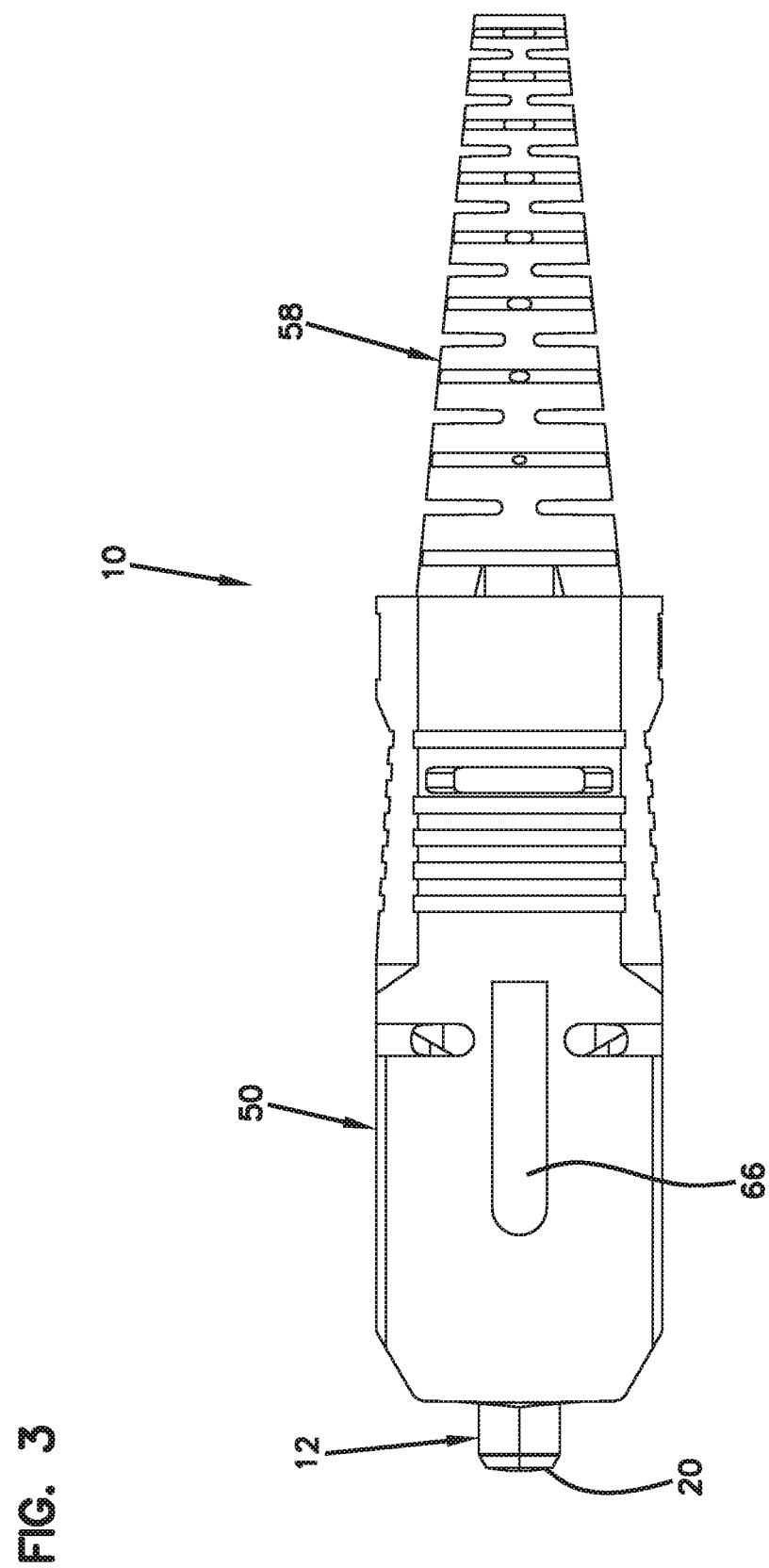
FIG. 3 is a top view of the fiber optic connector of FIG. 1.
Figure 4:
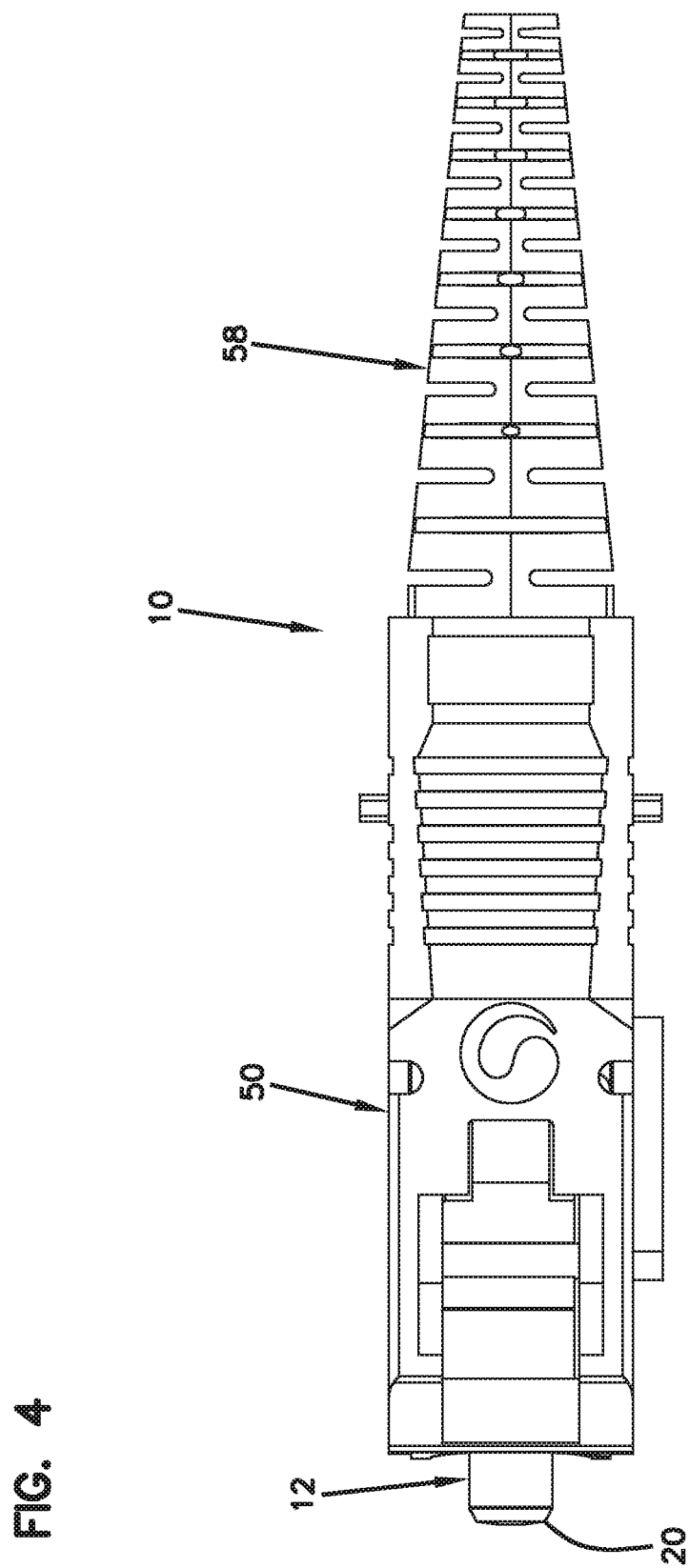
FIG. 4 is a side view of the fiber optic connector of FIG. 1.
Figure 5:
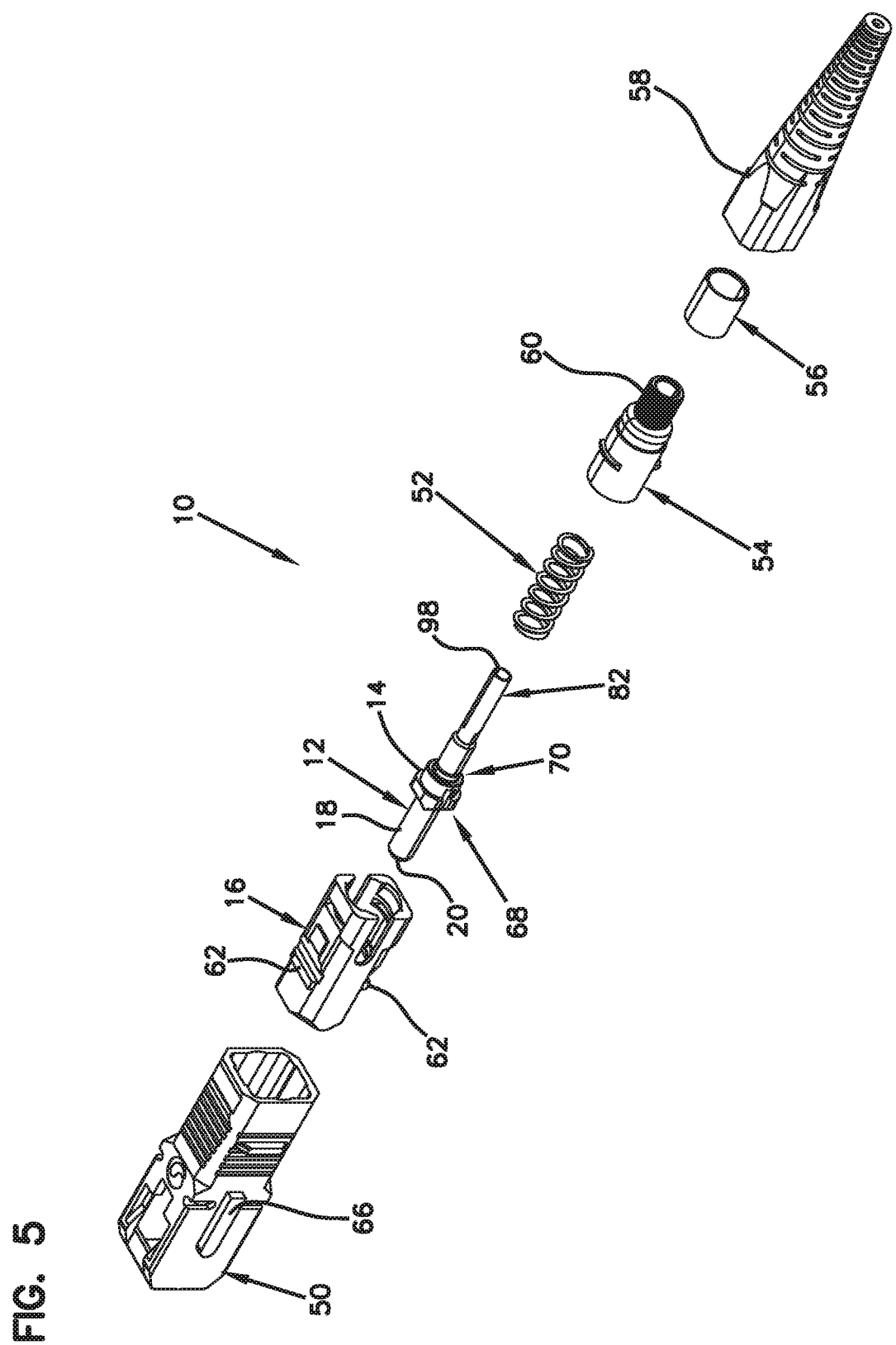
FIG. 5 is an exploded, perspective view of the fiber optic connector of FIG. 1.
Figure 6:
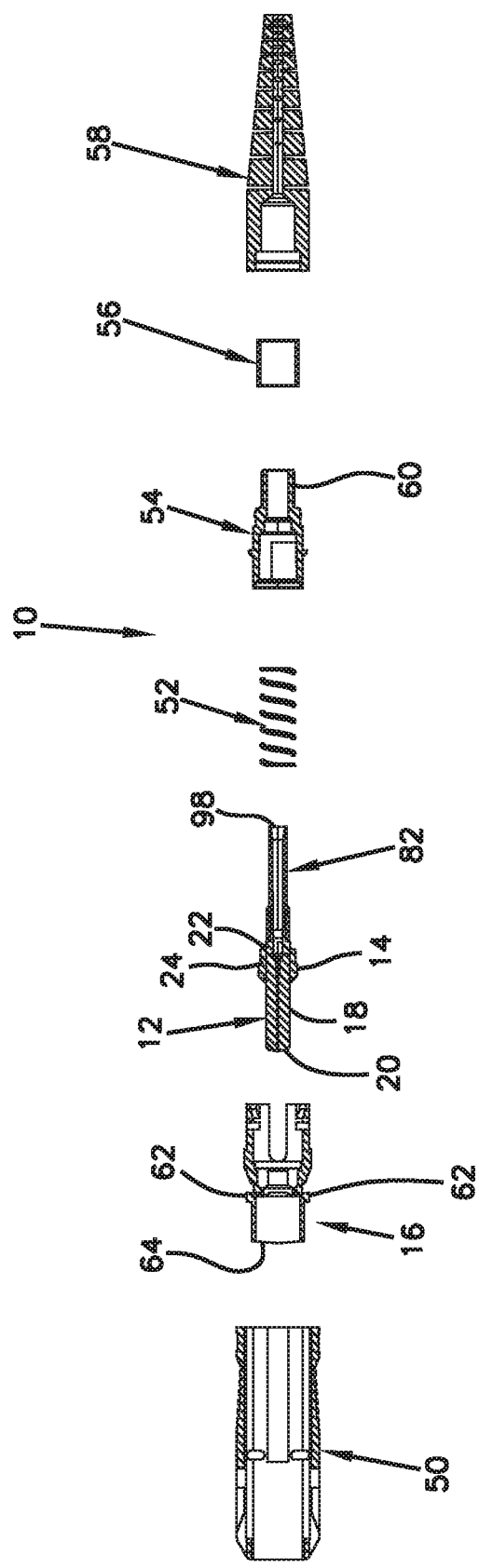
FIG. 6 is an exploded, cross-sectional view of the fiber optic connector of FIG. 4.
Figure 7:
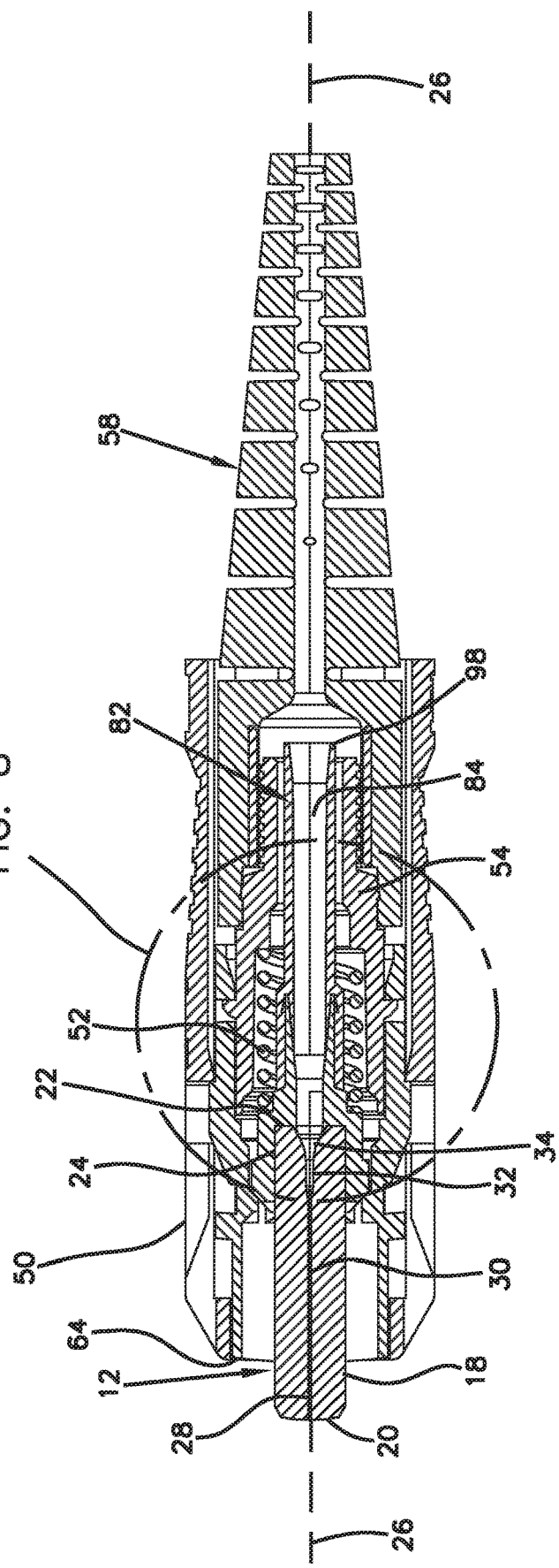
FIG. 7 is a cross-sectional view of the fiber optic connector of FIG. 3.

As illustrated at FIGS. 5-6, the fiber optic connector 10 may further include a release sleeve 50, a spring 52, a rear housing 54, a crimp sleeve 56, and a cable strain relief member 58 (e.g., fiber bend radius limiting structure). The rear housing 54 attaches to the connector housing 16 (e.g., by a snap-fit connection). The fiber optic ferrule 12, hub 14 and spring 52 are captured between the connector housing 16 and the rear housing 54. The fiber optic connector 10 is configured to be attached to an end of the fiber optic cable 36. The rear housing 54 includes a cable anchoring region 60 to which strength members (e.g., aramid yarn, fiberglass yarn, etc.) can be secured. The cable strain relief member 58 mounts at the interface between the fiber optic cable 36 and the rear housing 54.

The release sleeve 50 has a limited range of axial movement relative to the connector housing 16 and is configured to facilitate releasing the connector housing 16 from a fiber optic adapter. The release sleeve 50 is free to slide back-and-forth in distal and proximal directions relative to the connector housing 16 along the central axis 26 between a latching position and a release position. For example, once the fiber optic connector 10 has been inserted within the port of a fiber optic adapter, the release sleeve 50 can be retracted relative to the connector housing 16 to disengage latches of the fiber optic adapter from corresponding shoulders 62 on the connector body thereby allowing the fiber optic connector 20 to be withdrawn from the adapter. It will be appreciated that aspects of the present disclosure are also applicable to other types of fiber optic connectors such as LC-style connectors, as well as other types of fiber optic connectors.

The spring 52 functions to bias the fiber optic ferrule 12 in a forward direction. Epoxy in this area can cause the connector to lock up. When the fiber optic ferrule 12 is mounted at least partially within the connector housing 16, the first end 20 of the fiber optic ferrule 12 is accessible at a plug end 64 (see FIG. 6) of the connector housing 16. The release sleeve 50 includes a key 66 (see FIG. 2) that defines a tuned position for the fiber optic connector 10.

The cable strain relief member 58 functions to provide fiber bend radius protection to the fiber optic cable 30 at the interface between the fiber optic cable 36 and the fiber optic connector 10.

The crimp sleeve 56 may be used to crimp the cable strength members to the cable anchoring region 60. That is, once the fiber insertion process has been completed, the crimp sleeve 56 is slid forwardly over the cable anchoring region 60 of the rear housing 54 and used to crimp the front end of the strength member layer about the exterior surface of the cable anchoring region 60 of the rear housing 54. The cable strain relief member 58 is then slid forwardly over the crimp sleeve 56 and the cable anchoring region 60 of the rear housing 54.

To provide an effective optical connection between two fiber optic connectors, it is desirable for the fibers of the connected fiber optic connectors to be precisely coaxially aligned such that the cores of the optical fibers coaxially align with one another. In this regard, the central passages 28 of the fiber optic ferrules 12 are precisely oriented.

Figure 8:
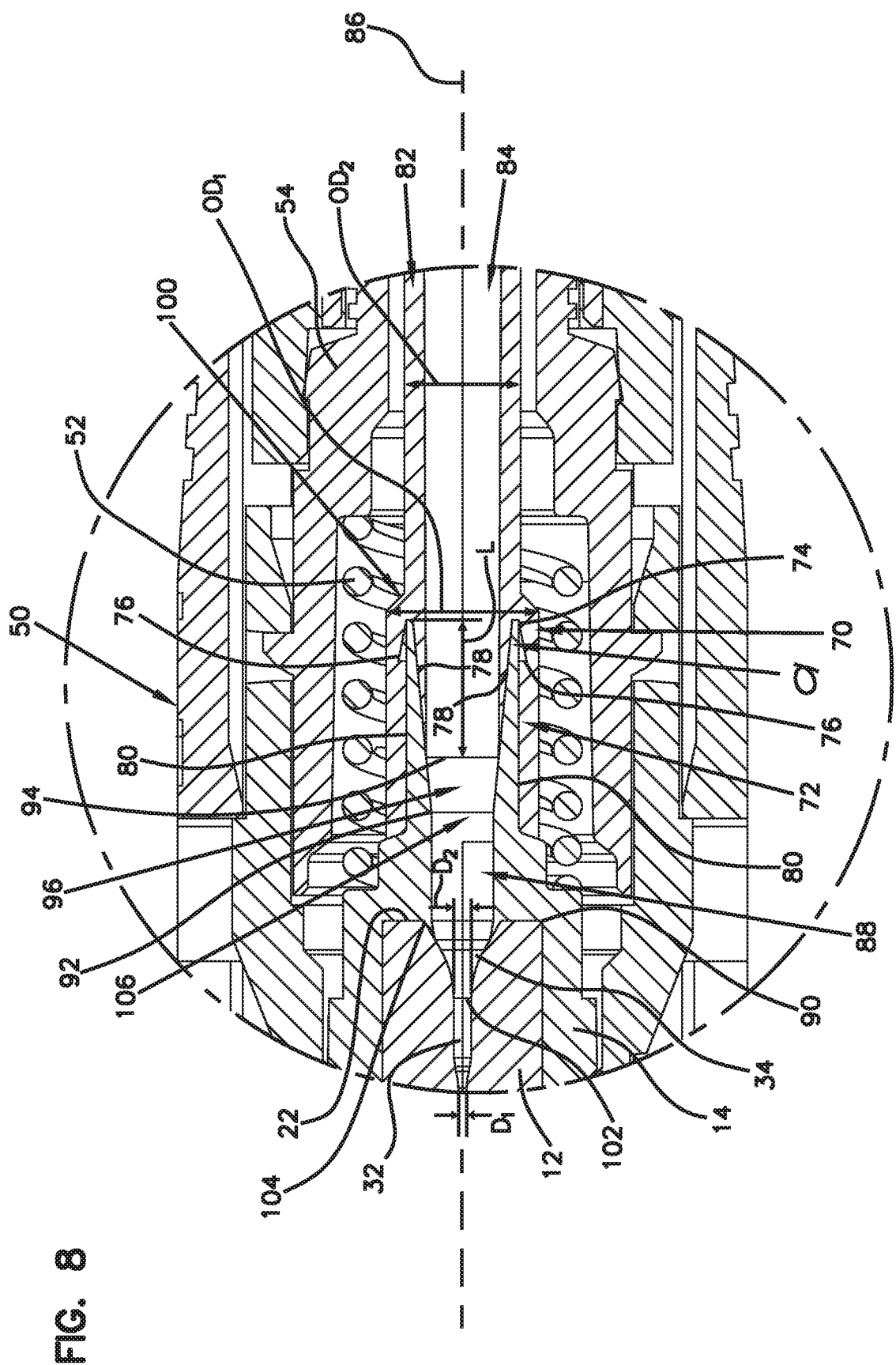
FIG. 8 is an enlarged view of a portion of FIG. 7.

Turning again to FIG. 5, the hub 14 may include a first end 68 and a second end 70 such that the first end 68 of the hub 14 is configured to mount over the second end 22 of the fiber optic ferrule 12. As illustrated at FIGS. 8 and 10, the second end 70 of the hub 14 may include a stem portion 72 that extends in a direction toward the rear housing 54 and stops at a termination end 74. In certain examples, the stem portion 72 may include a radially outwardly extending ramped flange portion or barb 76 adjacent the termination end 74 of the hub 14, although alternatives are possible. The stem portion 72 of the hub 14 also includes an internal surface 78 and an opposite external surface 80. The internal surface 78 of the hub 14 includes a taper 79. Taper 79 is for molding of an inner tube and for insertion of the fiber optic cable 36 without causing damage to the fiber optic cable 36. The barb 76 may be positioned on the external surface 80 of the hub 14. The barb is preferably circumferentially extending about the external surface 80. The barb 76 has a shoulder 116, an outer facing surface 118, and a rearward facing tip 120. Portion 122 of barb 76 is also part of taper 79. Hub 14 also includes a taper 77 at a fiber entry area of the ferrule 12.

Still referring to FIG. 8, the fiber optic connector 10 further includes an over-molded lead-in tube 82 (e.g., epoxy tube) in accordance with the principles of the present disclosure. The over-molded lead-in tube 82 defines a passage 84 with a tube axis 86 that aligns with the central axis 26. That is, the tube axis 86 and the central axis 26 can be concentric or coaxially aligned. The over-molded lead-in tube 82 can be arranged and configured to pass through a central region of the spring 52. The over-molded lead-in tube 82 may extend rearwardly towards the cable strain relief boot 58 to facilitate or guide the insertion of the epoxy needle for connector fill and/or to facilitate or guide the optical fiber 38 into the fiber optic ferrule 12.

The over-molded lead-in tube 82 is molded over the second end 70 of the hub 14. The over-molded lead-in tube 82 may be made of a cast material which is molded over the second end of the hub 14 such that the over-molded lead-in tube 82 and the hub 14 can be mechanically bonded. That is, the over-molded lead-in tube 82 is connected to the hub 14 by a non-unitary connection. The phrase "non-unitary connection" is intended to mean that the over-molded lead-in tube 82 and the hub 14 are not formed as a single, unitary, seamless piece.

The over-molded lead-in tube 82 may be made from a flexible plastic material that is injection moldable. In certain examples, the over-molded lead-in tube 82 is made from a thermoplastic material. Lead-in tube 82 is more flexible than hub 14. Such a construction may improve the ability of the connector 10 to meet side load requirements without excessive attenuation or damage of the fiber, as might occur if the hub and ferrule were molded at the same time from the same material. It is desirable in fiber connectors that the hub securely hold the ferrule, and a more rigid material serves this purpose.

An over-molded lead-in tube is advantageous over a more flexible tube pushed on over the end of the hub. The pushed on, more flexible over tube may create an internal fiber catch point. The pushed on, more flexible over tube may not be as easy to use in automated manufacturing where the tube must be added, and then maintain an axial profile for the epoxy needle and/or the fiber tip to enter and pass through.

A pushed on, internal tube will take up space and may not allow the needle and the cable to pass unless the connector body parts would become larger. This may not be possible due to industry size conventions. The pushed on, more flexible inner tube may not be as easy to use in automated manufacturing where the tube must be added, and then maintain an axial profile for the epoxy needle and/or the fiber tip to enter and pass through.

Once the over-molded lead-in tube is manufactured, the ferrule, hub, and tube can be handled as a single unit during connectorization of fiber optic cable.

The hub 14 includes an axial passage 106 that defines the upper bore section 88 defined between a first bore end 90 and a second bore end 92 through which the buffer cable 42 is passed. The upper bore section 88 can be adapted to contain the end of the buffer layer 42. Thus, the upper bore section 88 may be arranged and configured with a diameter greater than the 900 micron buffer layer 42, such as 970 microns. In one example, the distance between the first and second bore ends 90, 92 is about 1.5-2.0 mm, such as 1.7 mm. The over-molded lead-in tube 82 has a distal end 98 that tapers outwardly along an inside surface to facilitate insertion of fiber 38, and the buffer layer 42 of the fiber optic cable 36 into the passage 84.

The hub 14 also defines a third bore end 94 at the front of the lead-in tube end that is configured to provide a desired location just past it for positioning an epoxy depositing needle. An epoxy needle shut off zone 96 can be defined between the second bore end 92 and the third bore end 94. There exists a taper 79 between the second bore end 92 and the third bore end 94 extending to end of hub 74. The epoxy needle can be sealed against the taper 79 such that a controlled volume of epoxy can be dispensed.

Figure 8A:
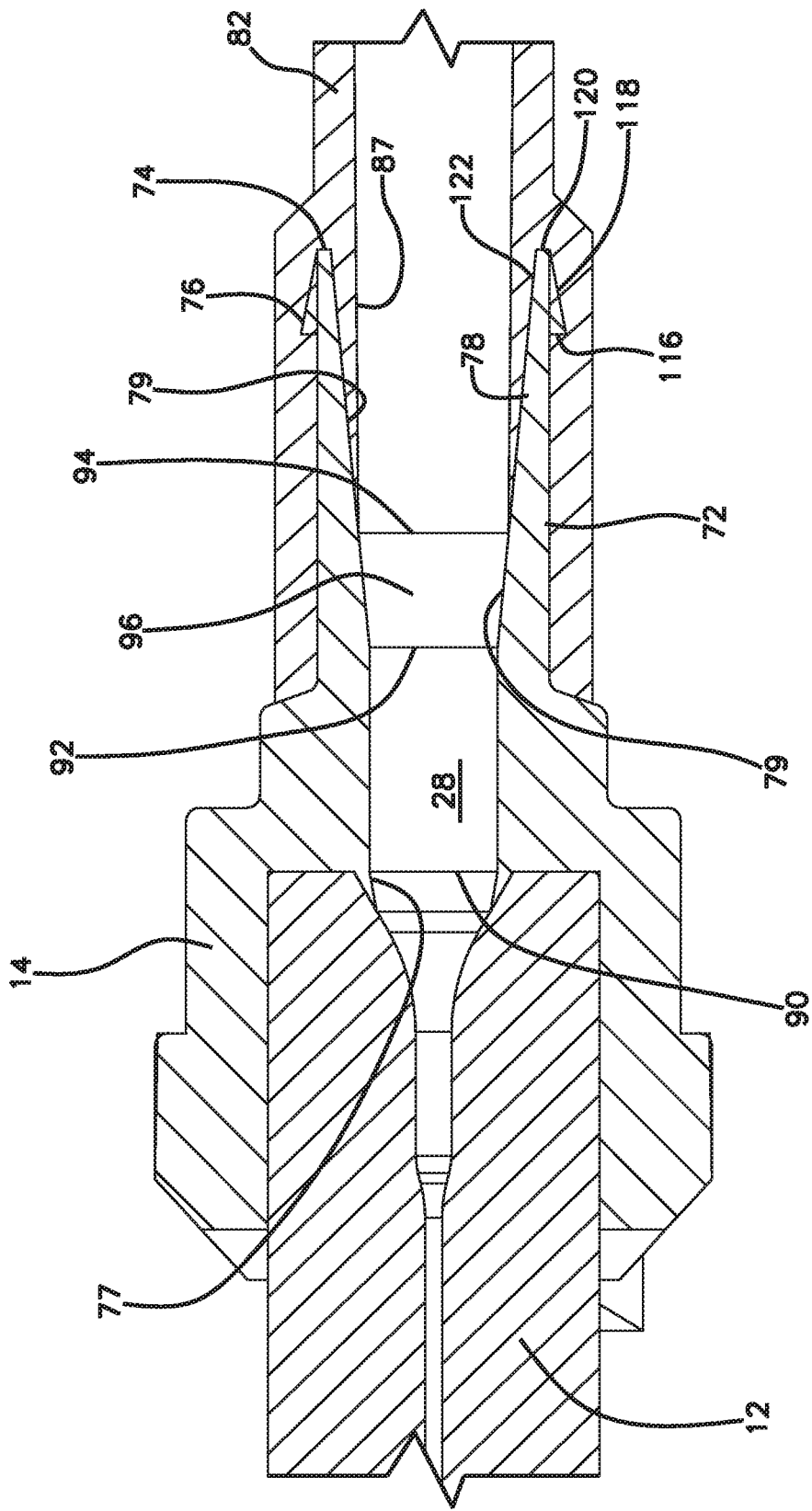
FIG. 8A is a further enlarged view of a portion of FIG. 7.

As illustrated in FIGS. 8 and 8A, the internal surface 78 of the stem portion 72 of the hub 14 begins to taper outwardly from the second bore end 92 relative to the central axis 26 to form taper 79. A portion of taper 79 is covered up by tube 82.

In one example, the internal surface 78 of the hub 14 has a tapered length L corresponding to the covered portion that can be defined from the third bore end 94 to the termination end 74 of the hub 14. Taper 79 is about 3 mm long in the axial direction from end 92 to end 74. End 92 is at an example 0.97 mm bore size. The tapered length L can be about 2.0-2.1 mm long in the axial direction from the third bore end 94, at an example 1.13 mm bore size (0.57 mm radially relative to the central axis 26) to the termination end 74, at example 1.5 mm bore size (0.75 mm radially) relative to the central axis 26. The internal surface 78 along taper 79 of the stem portion 72 of the hub 14 may form a cone shape with an angle α of about 11 degrees+/−1 degree centered about the central axis 26.

The over-molded lead-in tube 82 may be constructed of plastic by an injection molding process in which a resin or polymeric material can be used to form a mold. The method can include a step of inserting a solid over-mold pin into the hub 14 along the central axis 26 until the solid over-mold pin bottoms out. The solid over-mold pin can be positioned at a location within the stem portion 72 of the hub 14. It will be appreciated that the location of the solid over-mold pin may stop within a range inside the hub 14 between the second bore end 92 and the termination end 74, although alternatives are possible. In certain examples, the solid over-mold pin may be positioned slightly beyond or slightly short of the illustrated third bore end 94 in the tapered length L area of the stem portion 72. It is desired that the needle shut off zone 96 be positioned downstream of the over-mold pin stop 94 toward a front end of the connector. It is preferred the needle shut off against hub 14, along taper 79, downstream of the inner portion of the tube 82.

In certain examples, the over-mold may be configured with a step 100 that is defined between a first outer diameter $OD_1$ and a second outer diameter $OD_2$ of the over-molded lead-in tube 82. During the molding process, the polymer resin flows around to fill in areas inside and around the stem portion 72 of the hub 14 to form the molded over-molded lead-in tube 82. When the over-molded lead-in tube 82 is rigid enough (e.g., before fully cured or cooled), the solid over-mold pin can be removed therefrom. The over-mold tube 82 in the example has a slight taper between the third bore end 94 and the distal end 98 to release the solid over-mold pin. Thus, the over-molded lead-in tube 82 can be formed as a result of molding around the solid over-mold pin positioned in the hub 14. Tube 82 can have a greater taper on the inside surface immediately adjacent the end 98, if desired.

The over-molded lead-in tube 82 may surround all sides of the stem portion 72 of the hub 14 such that potential catch points are avoided when inserting the optical fiber 38. That is, the over-molded lead-in tube 82 may cover the internal surface 78 of the stem portion 72 of the hub 14 that includes the tapered length L. The over-molded lead-in tube 82 tapers inside of the hub 14 from the termination end 74 of the hub 14 to about zero thickness at the third bore end 94. As such, the inside of the hub 14 is surrounded by the over-molded lead-in tube 82 to eliminate optical fiber catch points therein. The over-molded lead-in tube 82 may have a taper that follows along the tapered length L. Thus, similar to the angle α of the tapered length L, the angle α of the over-molded lead-in tube 82 molded over the internal surface 78 of the stem portion 72 inside of the hub 14 may taper from the termination end 74 to the third bore end 94 and will be about 5.5 degrees+/−0.5 degrees relative to the central axis 26 to about zero thickness relative to the central axis 26. Thus, the over-molded lead-in tube 82 has a taper that avoids catch points on the hub tip that may interfere and stop forward progress of the optical fiber 38. The tube 82 inside diameter also has a small internal taper to facilitate manufacture.

The over-molded lead-in tube 82 is shown molded to completely surround the external surface 80 of the hub and the barb 76 positioned thereon. That is, the over-molded lead-in tube 82 fully encapsulates the barb 76 of the hub 14. As such, the over-molded lead-in tube 82 may be molded over four side portions of the hub 14. The barb 76 of the hub 14 may be configured to function as a retention element that engages the over-molded lead-in tube 82 to help secure the over-molded lead-in tube 82 within the fiber optic connector 10.

In certain examples, the retention feature may include a bump, recess, shoulder or dent that may be arranged and configured to help prevent the over-molded lead-in tube 82 from detaching.

Figure 10A:
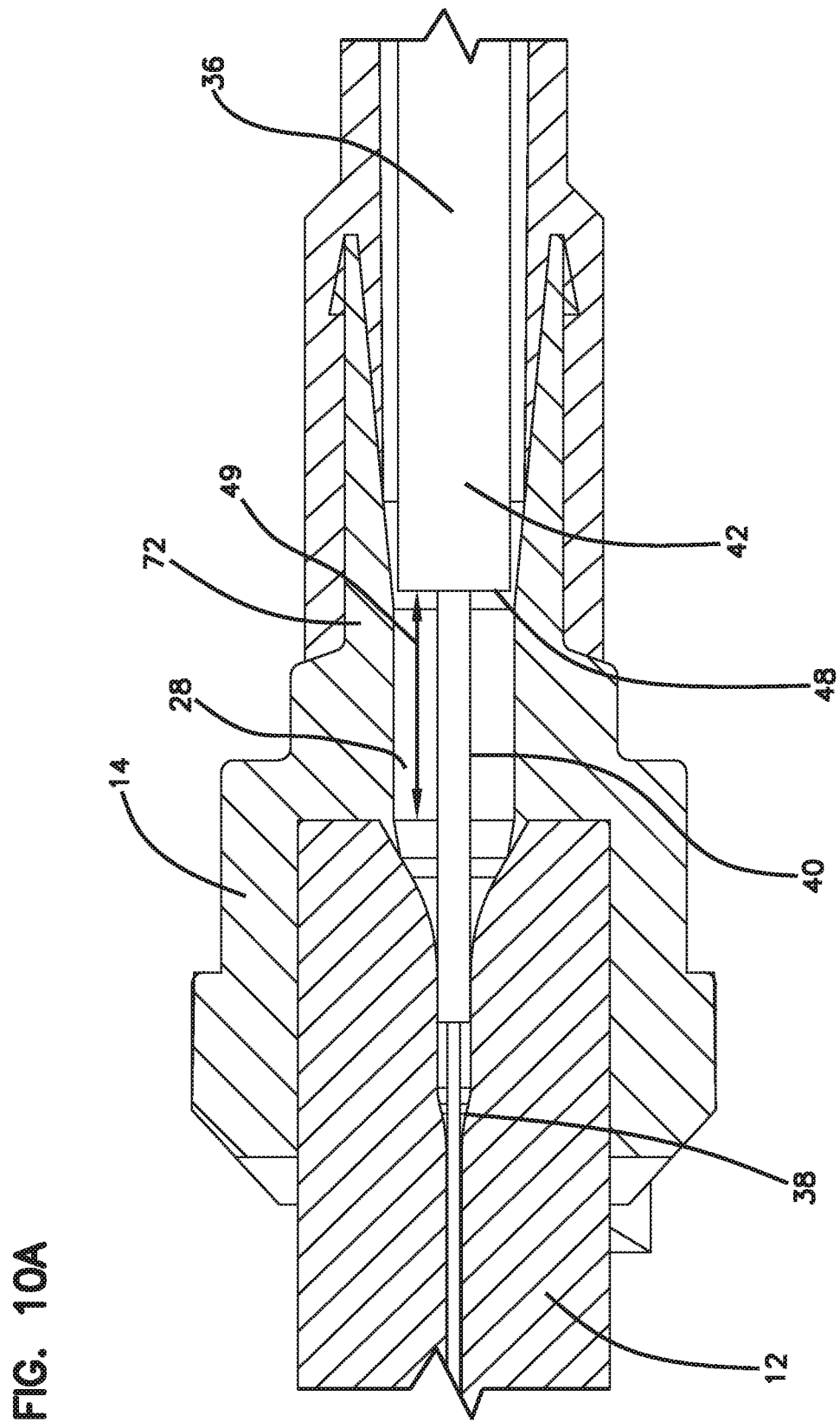
FIG. 10A is a further enlarged view of a portion of FIG. 9.

End 48 of buffer 42 can extend deeper into hub 14 than is illustrated in the example in FIGS. 10 and 10A, if desired. See arrow 49.

FIGS. 11-28 illustrate another example fiber optic connector 200 with features in accordance with the principles of the present disclosure. The fiber optic connector 200 depicted is configured as an LC connector and is configured to be used in fiber optic equipment that have a standard LC footprint.

The fiber optic connector 200 includes a front housing 202 that defines a body 204 with opposing side walls 206, 208, a top wall 210, a bottom wall 212, a front end 214 and a rear end 216. In certain examples, the front housing 202 may be formed from a molded material, including various polymers. The front housing 202 defines a latch 218 extending from the top wall 210 of the front housing 202 toward the rear end 216, the latch 218 extending at an acute angle with respect to the top wall 210 of the front housing 202. The front housing 202 also includes a latch trigger 220 that extends from the rear end 216 of the front housing 202 toward the front end 214. The latch trigger 220 also extends at an acute angle with respect to the top wall 210. The latch trigger 220 is configured to come into contact with the latch 218 for flexibly moving the latch 218 downwardly.

When the fiber optic connector 200 is placed in a fiber optic adapter for optically coupling light from two optical fibers together, the latch 218 functions to lock the fiber optic connector 200 in place within the fiber optic adapter. The fiber optic connector 200 may be removed from the fiber optic adapter by depressing the latch trigger 220, which causes the latch 218 to be pressed in a downward direction, freeing the latch 218 from the fiber optic adapter.

The front housing 202 defines a front opening 222, a rear opening 224, and an internal cavity 226 extending therebetween. The front opening 222 and the rear opening 224 are circular in shape.

The fiber optic connector 200 includes a rear insert 228 adapted to be mated with the front housing 202 to form the fiber optic connector 200. The rear insert 228 is coupled to the front housing 202 to capture a spring 230 and a ferrule hub 232 therewithin. When the fiber optic connector 200 is assembled, a terminal end of an optical fiber 234 (see FIG. 19) extends through the front opening 222. The optical fiber 234 is an extension of an optical fiber carried in a fiber optic cable 236 (see FIG. 19) terminated to the fiber optic connector 200. The same general fiber sizes are used in SC and LC. One difference is that the LC connector has a small footprint than the SC connector in the axial direction. An LC ferrule is generally half the outer diameter of an SC ferrule.

Within the fiber optic connector 200, the optical fiber 234 may pass through a crimp sleeve 238 and the rear insert 228 before being led to the internal cavity 226 of the front housing 202. The rear insert 228 includes a rear portion 240 that defines a crimp zone for crimping on the cable's reinforced Kevlar layer as is generally known in the art. A strain relief boot 242 surrounds the rear portion 240 and the fiber optic cable 236. The strain relief boot 242 may be in snap-fit connection with the rear portion 240 of the rear insert 228.

A ferrule 244 of the fiber optic connector 200 includes a body 246 with a first end 248 defining a ferrule tip. The first end 248 may comprise a polished end face surface that abuts an end face of another ferrule when the fiber optic connector 200 is disposed in an adapter that optically couples the optical fiber disposed within the adapter. The first end 248 of the ferrule 244 is typically polished along with the optical fiber 234 after the optical fiber 234 is installed. The body 246 of the ferrule 244 is typically ceramic in construction. The ferrule 244 includes a central axis 250.

Once the ferrule hub 232, the ferrule 244 and the spring 230 have been placed in the front housing 202, the rear insert 228 may be placed in contact with an end of the spring 230. The rear insert 228 holds the ferrule hub 232 and the spring 230 in place within the front housing 202 while also enhancing the side-loading capacity of the fiber optic connector 200.

Figure 18:
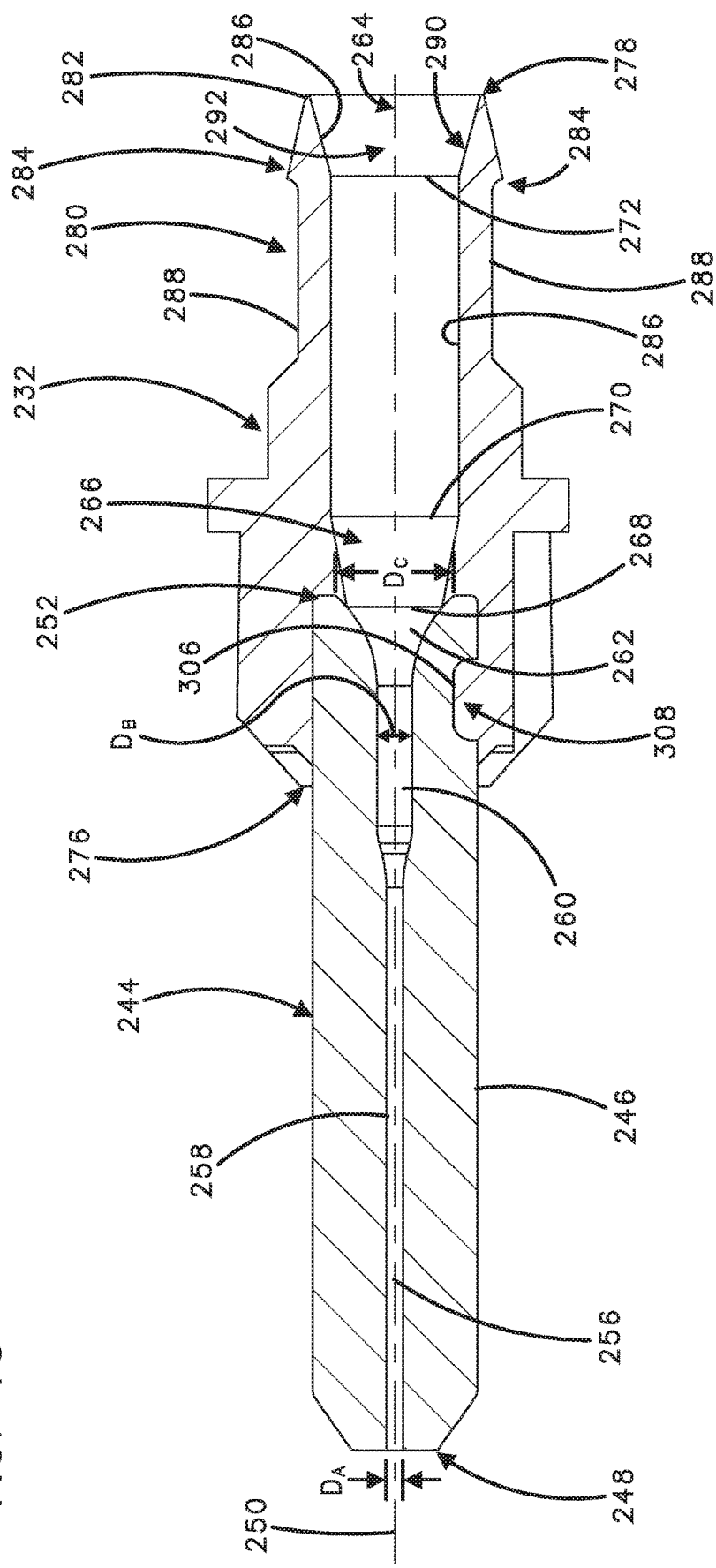
FIG. 18 is a cross-sectional view of the ferrule hub and ferrule of FIG. 17.
Figure 19:
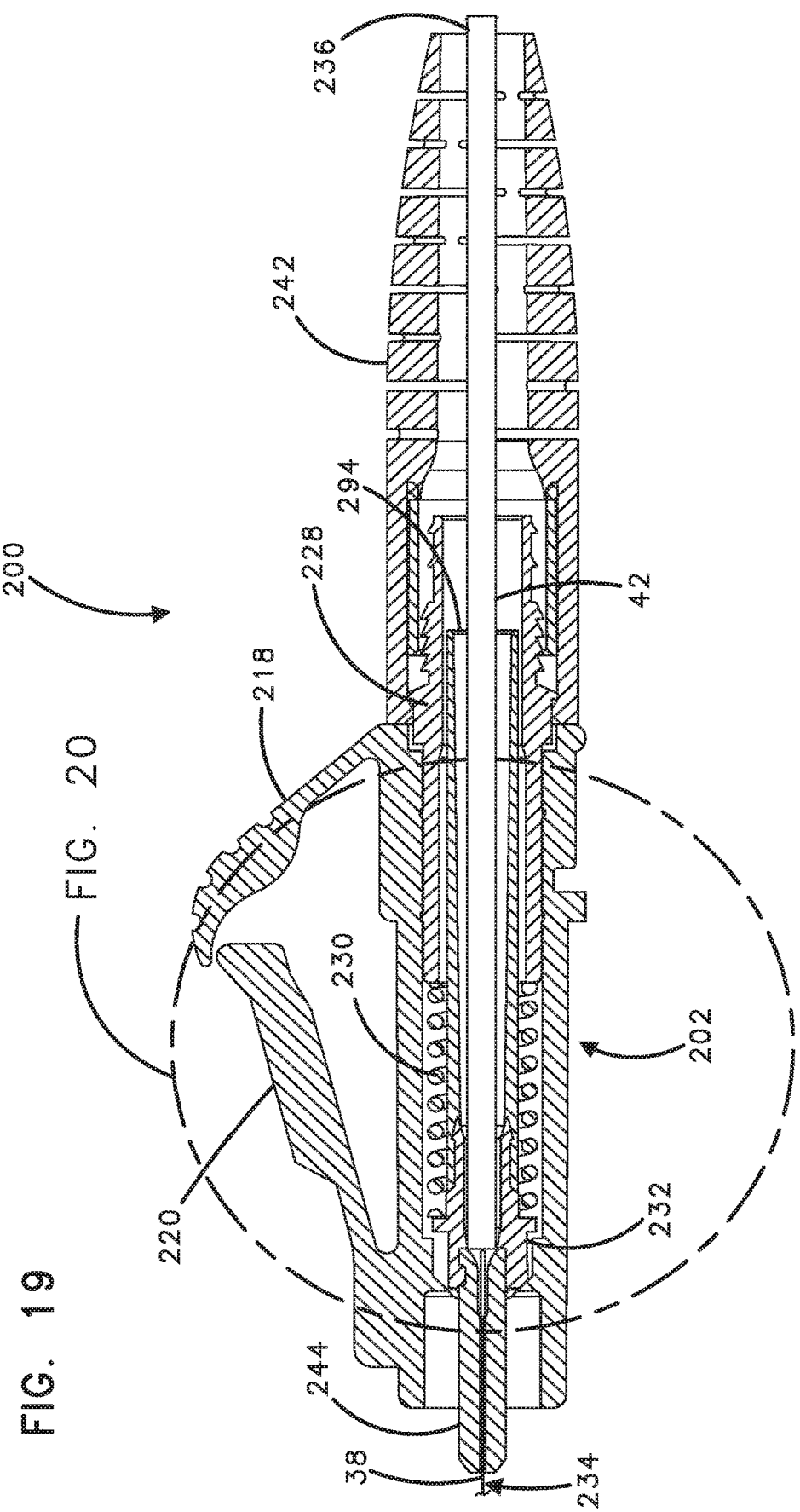
FIG. 19 is a cross-sectional view of the fiber optic connector of FIG. 13 including a fiber optic cable.

Turning to FIGS. 16-18, the ferrule hub 232 and the ferrule 244 are depicted.

Figure 20:
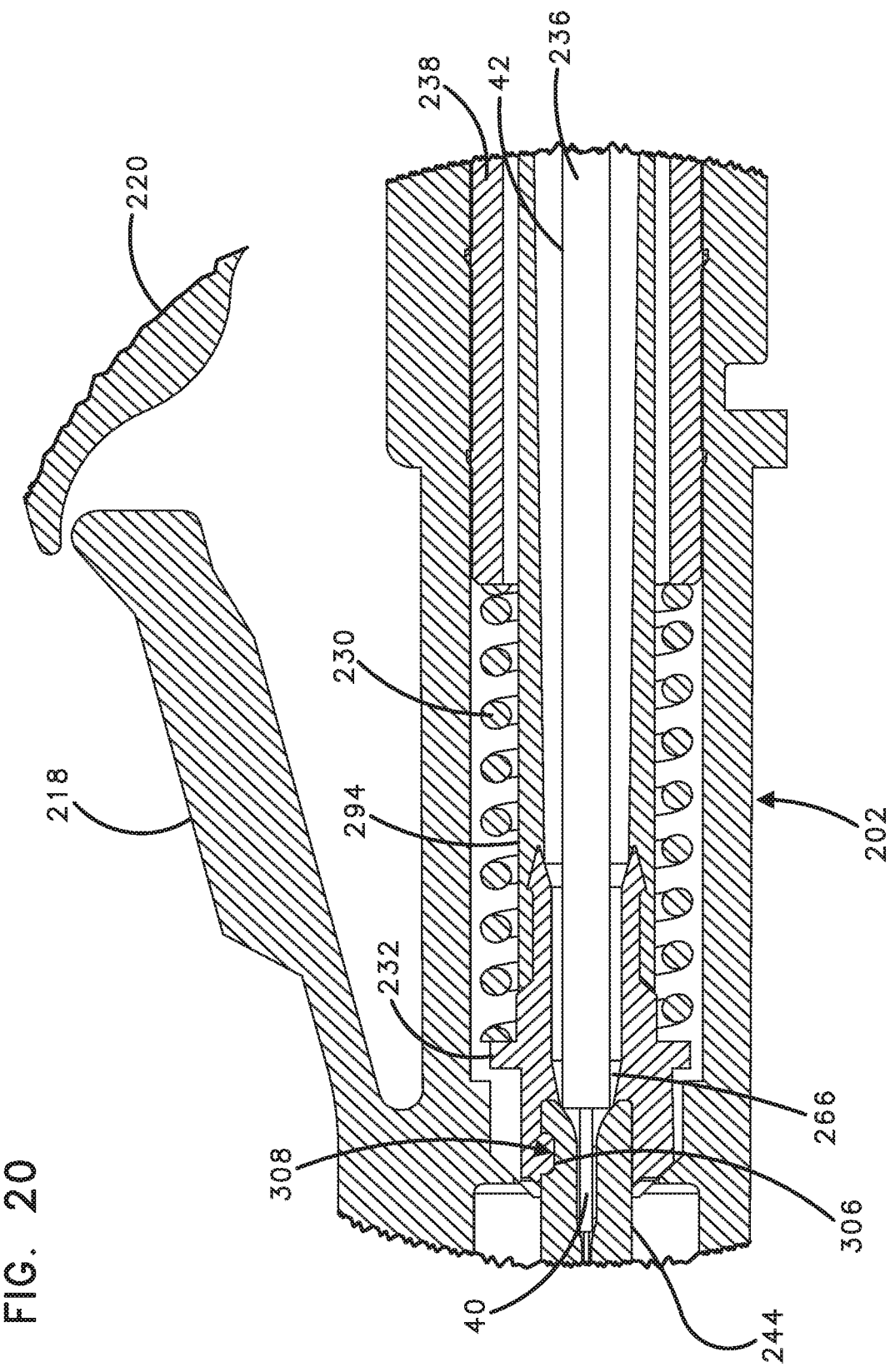
FIG. 20 is an enlarged view of a portion of the fiber optic connector of FIG. 19.
Figure 21:
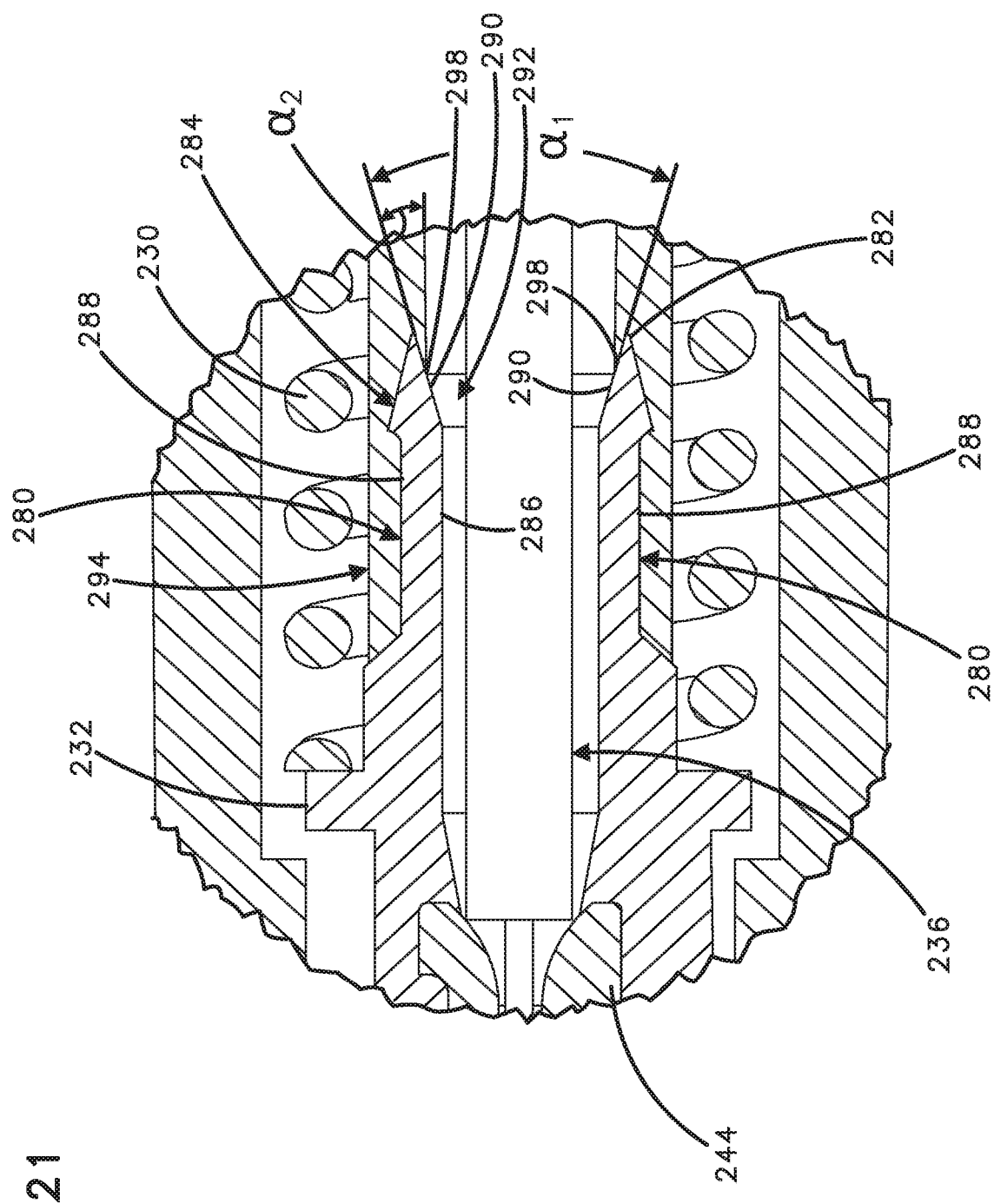
FIG. 21 is an enlarged view of a portion of the fiber optic connector of FIG. 20.
Figures 22, 23:
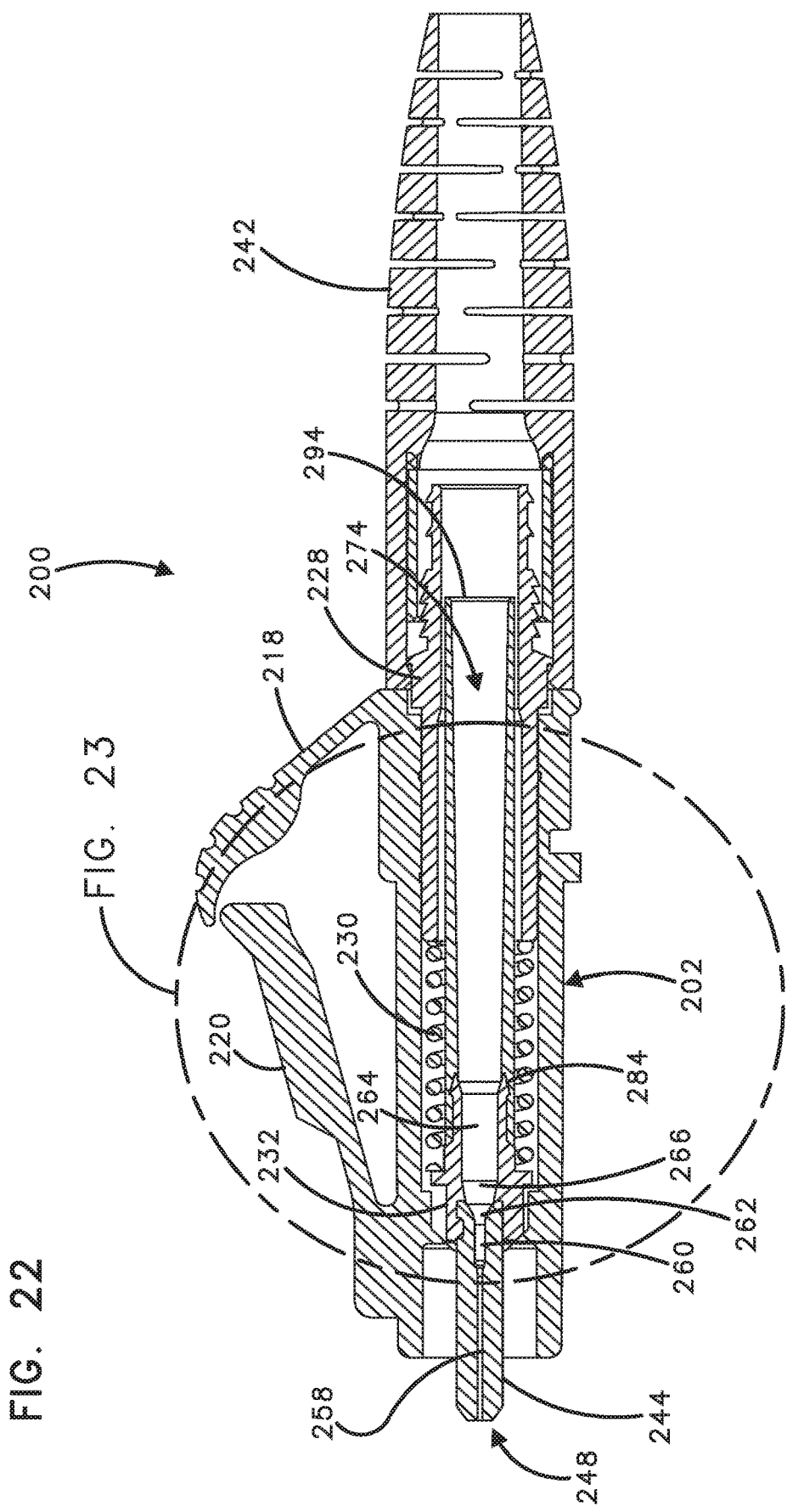
FIG. 22 is a cross-sectional view of the fiber optic connector of FIG. 19 without the fiber optic cable.
FIG. 23 is an enlarged view of a portion of the fiber optic connector of FIG. 22.
Figure 23:
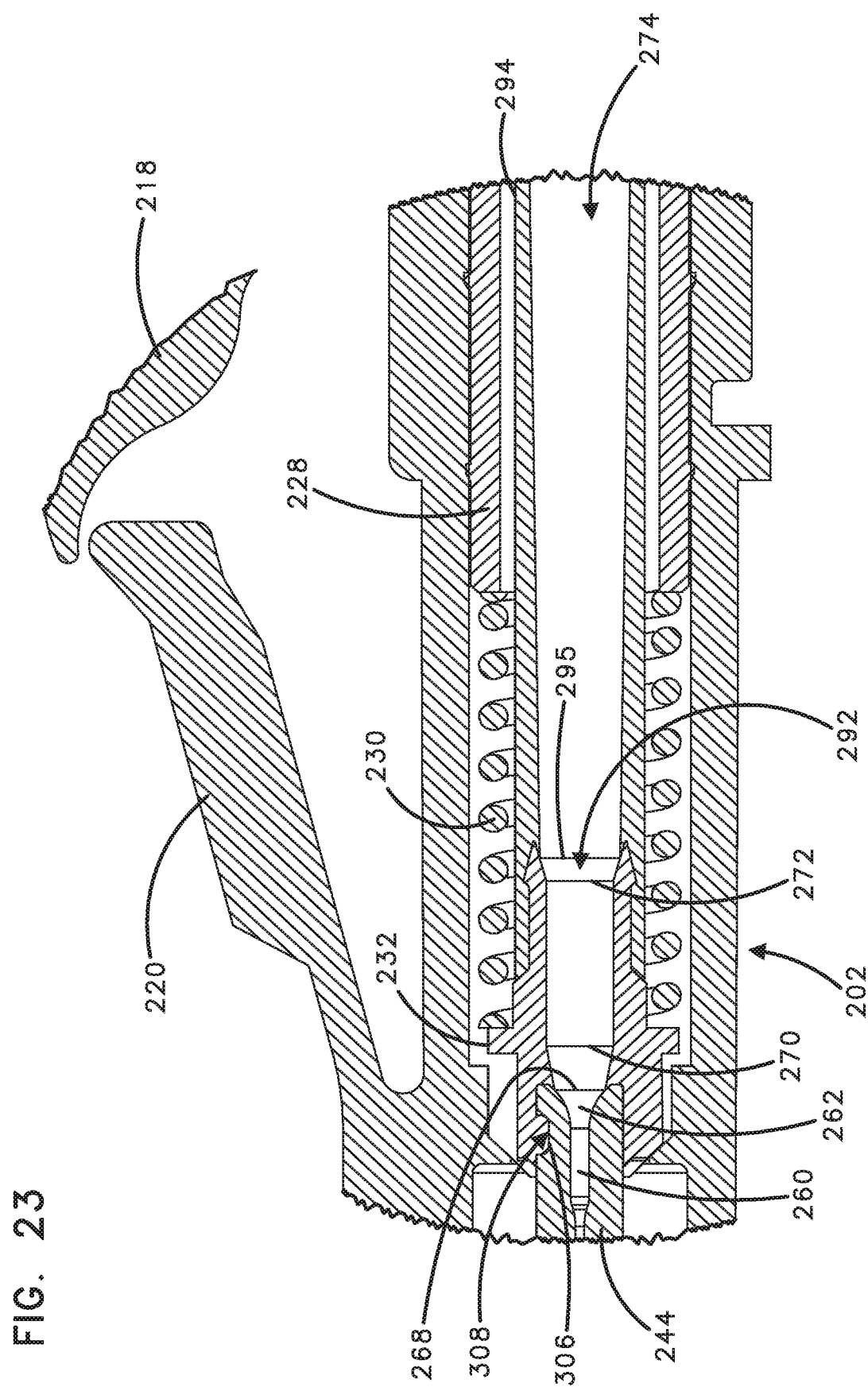
Figure 24:
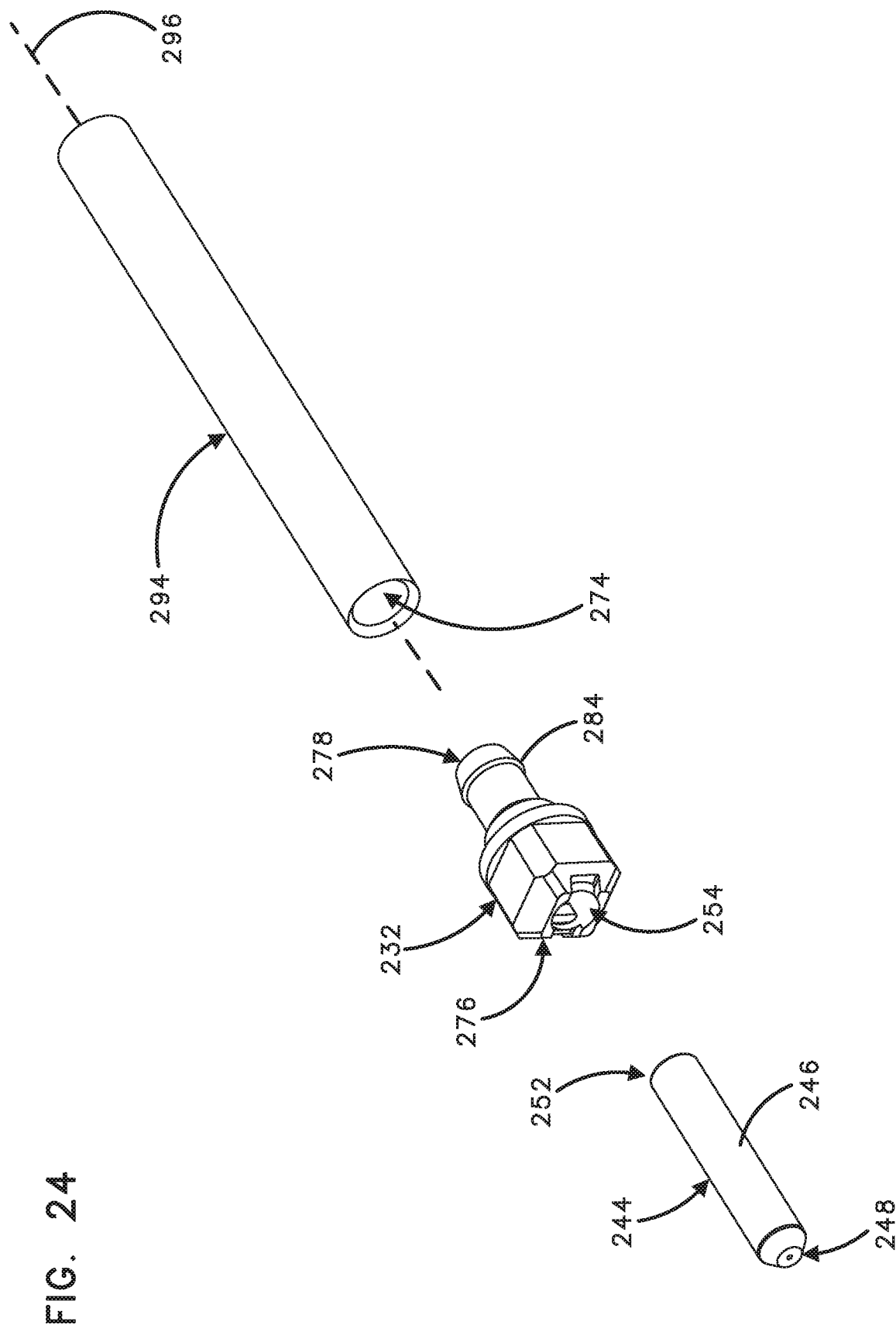
FIG. 24 is an exploded perspective view of the ferrule hub and the ferrule including an epoxy tube for the connector of FIG. 11 in accordance with the principles of the disclosure.
Figure 27:
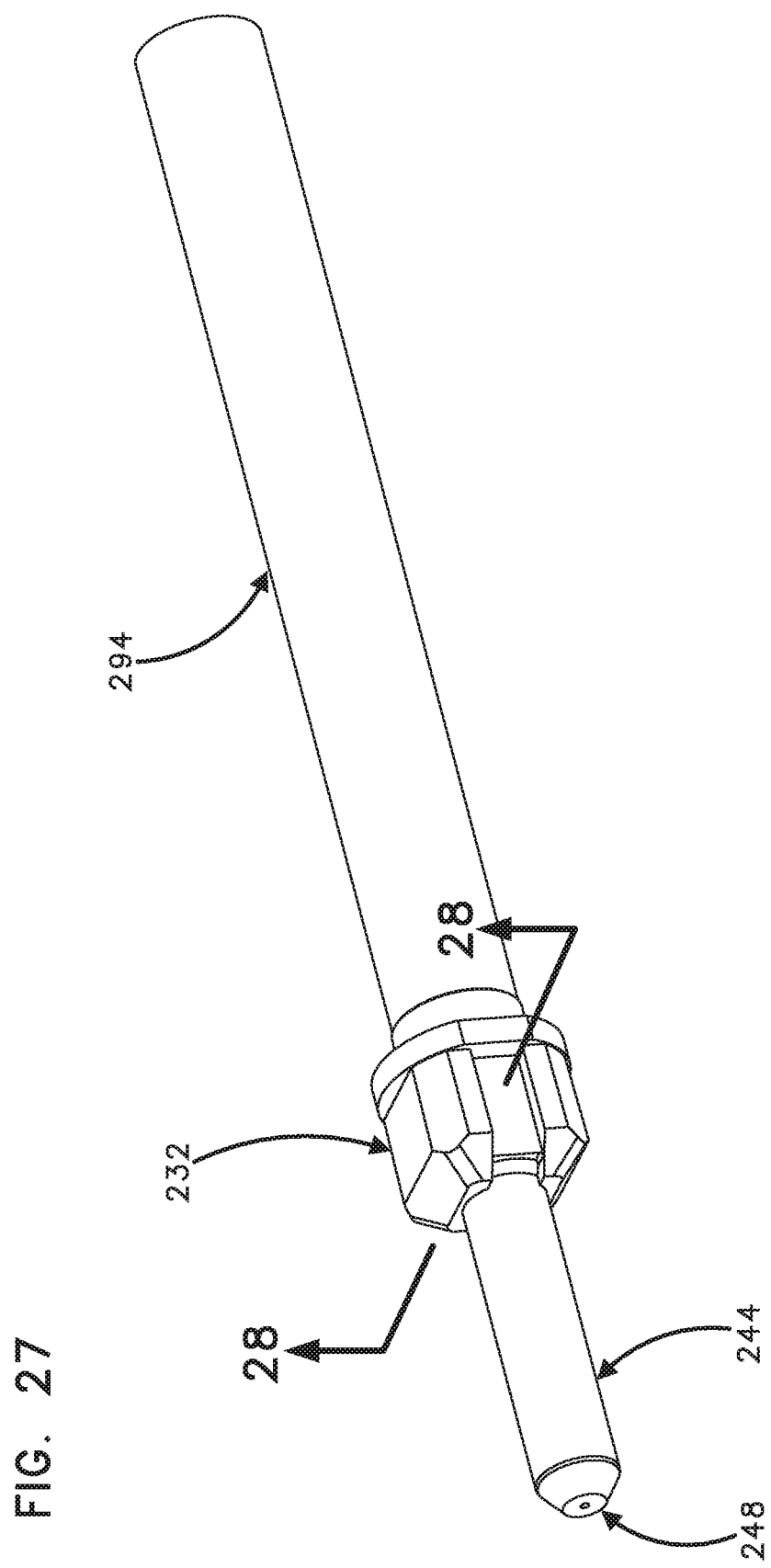
FIG. 27 is a perspective view of the ferrule hub, ferrule and epoxy tube of FIG. 25.
Figure 28:
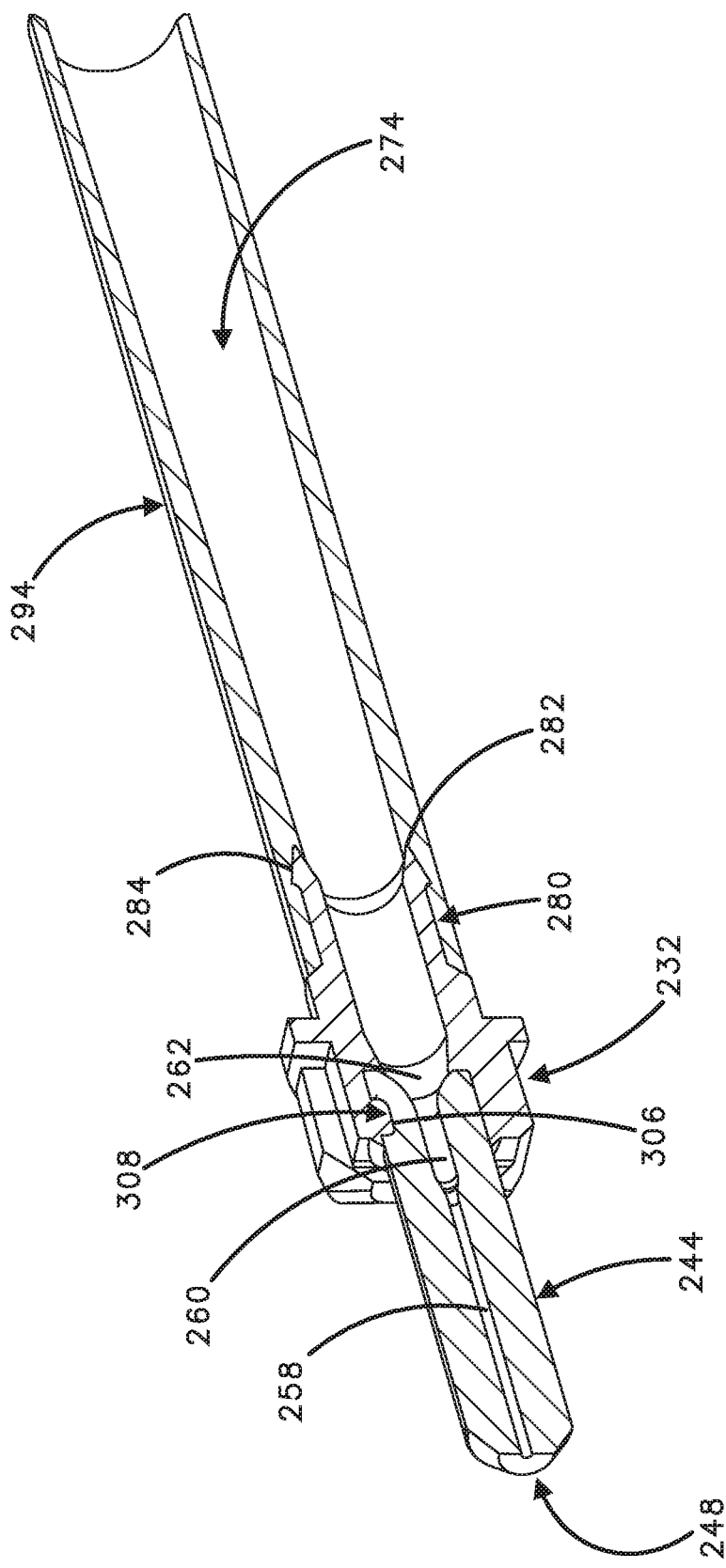
FIG. 28 is a cross-sectional view of the ferrule hub, ferrule and epoxy tube of FIG. 27.

The ferrule 244 may be attached to the ferrule hub 232 by a variety of methods. Generally, the ferrule 244 and the ferrule hub 232 are secured together by convenient methods including press-fit or adhesive mounts. In certain examples, including the illustrated example, the ferrule hub 232 is a plastic material that is overmolded onto the ferrule 244. As described above, with respect to the fiber optic ferrule 12 and the hub 14, the ferrule 244 and the ferrule hub 232 are connected to an end of the fiber optic cable 236 for use in connectorizing the end of the fiber optic cable 236. As illustrated at FIG. 20, the body 246 of the ferrule 244 includes an opposite end 252 received in a pocket 254 of the ferrule hub 232.

In certain preferred embodiments, the body 246 of the ferrule 244 is made of yttria-stabilized zirconium-oxide, yttria-stabilized zirconia, YSZ, $Y_2O_3$ stabilized $ZrO_2$, etc. In certain preferred embodiments, the body 246 of the ferrule 244 is molded. By molding the ferrule 244, internal features can be included within the ferrule 244. The internal features can be smooth and continuous and include curvature. The smooth and continuous internal features can be produced at a lower cost than by alternative methods, such as machining. Also, the fiber is better protected from scratches.

Turing again to FIGS. 18-21, the ferrule 244 includes a central passage 256 concentric with the central axis 250. The central passage 256 extends from the first end 248 to the opposite end 252. The central passage 256 includes a first portion 258 having a first diameter $D_A$, an intermediate or second portion 260 having a second diameter DB, and a rear or third portion 262 sized at a third diameter Dc. As above, a small taper on the hub leads to third portion 262.

As with the first portion 30 mentioned above, the first portion 258 is sized to receive an inner fiber sized at 125 microns. As with the second portion 32 mentioned above, the second portion 260 is sized to receive the portion of the fiber optic cable 236 including an outer coating at 250 microns. That is, the ferrule 244 includes dual diameter portions 258, 260, each specially sized to receive an inner fiber (125 microns) and a portion of an outer coating (250 microns), respectively. As with the third portion 34 mentioned above, the third portion 262 is tapered inwardly from the opposite end 252 so as to facilitate insertion of the optical fiber 234 during installation.

By having the smooth and continuous central passage 256, scratching and scoring of the inner fiber 38 and the outer coating 40 can be eliminated or substantially reduced. The scratching and scoring of the inner fiber 38 and/or the outer coating 40 can produce defects that can grow into fatigue cracks and lead to failure of the optical fiber 234. The ferrule 244 closely surrounds the optical fiber 234, and the coating 40.

The ferrule hub 232 includes an axial passage 264 that defines an upper bore section 266 defined between a first bore end 268 and a second bore end 270 through which the buffer layer 42 of the fiber optic cable 236 is passed. The upper bore section 266 can be adapted to contain the end of the buffer layer 42. Thus, the upper bore section 266 may be arranged and configured with a diameter greater than the 900 micron buffer layer 42. In one example, the distance between the first and second bore ends 268, 270 is about 0.6 mm, with an outward taper of about 10 degrees relative to the axis. The ferrule hub 232 also defines a third bore end 272 that tapers outwardly. The distance between bore ends 270 and 272 is about 2.5 mm in one example, each with a bore diameter of 0.97 mm.

Buffer layer 42 is shown closer to ferrule 244 in connector 200 than in connector 10. These FIGS. illustrate the variability and range of possible locations of the fiber and buffer tube in the disclosed connectors.

The ferrule hub 232 includes a first end 276 and a second end 278 such that the first end 276 of the ferrule hub 232 is configured to mount over the opposite end 252 of the ferrule 244. The second end 278 of the ferrule hub 232 may include a stem portion 280 that extends in a direction toward the rear insert 228 and stop at a termination end 282. In certain examples, the stem portion 280 may include a radially outwardly extending ramped flange portion or barb 284 adjacent the termination end 282 of the ferrule hub 232, although alternatives are possible. The stem portion 280 of the ferrule hub 232 may also include an internal surface 286 and an opposite external surface 288. The internal surface 286 of the ferrule hub 232 tapers from the third bore end 272 outwardly to facilitate insertion of the fiber optic cable 236 without causing damage to the fiber optic cable 236. The barb 284 may be positioned on the external surface 288 of the ferrule hub 232. There exists a tapered portion 290 that begins to taper outwardly from the third bore end 272 relative to the central axis 250 toward the second end 278 of the ferrule hub 232.

An epoxy needle can be sealed against the taper such that a controlled volume of epoxy can be dispensed. Epoxy is used within the central passage 256 to adhesively hold the fiber optic cable 236 to the ferrule 244. An epoxy needle shut off zone 292 can be defined adjacent to the third bore end 272. That is, an epoxy needle can be sealed against the tapered portion 290 of the ferrule hub 232 such that a controlled volume of epoxy may be dispensed.

Referring to FIGS. 22-28, the fiber optic connector 200 further includes an over-molded lead-in tube 294 (e.g., epoxy tube) in accordance with the principles of the present disclosure. The over-molded lead-in tube 294 defines a passage 274 with a tube axis 296 that aligns with the central axis 250. That is, the tube axis 296 and the central axis 250 can be concentric or coaxially aligned. The over-molded lead-in tube 294 can be arranged and configured to pass through a central region of the spring 230. The over-molded lead-in tube 294 may extend rearwardly towards the cable strain relief boot 242 to facilitate or guide the insertion of the optical fiber 234 into the ferrule 244.

The over-molded lead-in tube 294 is molded over the second end 278 of the ferrule hub 232. The over-molded lead-in tube 294 may be made from a flexible plastic material that is injection moldable. In certain examples, the over-molded lead-in tube 294 is made from a thermoplastic. In certain examples, the over-molded lead-in tube 294 may be made of a cast material which is molded over the second end of the ferrule hub 232 such that the over-molded lead-in tube 294 and the ferrule hub 232 can be mechanically bonded. That is, the over-molded lead-in tube 294 is connected to the ferrule hub 232 by a non-unitary connection. The phrase "non-unitary connection" is intended to mean that the over-molded lead-in tube 294 and the ferrule hub 232 are not formed as a single, unitary, seamless piece.

The over-molded lead-in tube 294 may be constructed of plastic by an injection molding process as described above with reference to the over-molded lead-in tube 82. During the molding process, the polymer resin flows around a solid over-mold pin to fill in areas inside and around the stem portion 280 of the ferrule hub 232 to form the molded over-molded lead-in tube 294. Tube 294 terminates at bore 295 along the tapered portion 290 of the ferrule hub 232. In one example the diameter of bore 295 is about 1.15 mm.

Turning again to FIG. 21, the over-molded lead-in tube 294 may surround all sides of the stem portion 280 of the ferrule hub 232 such that all potential catch points are avoided when inserting the optical fiber 234. That is, the over-molded lead-in tube 294 may be molded to surround all sides of the stem portion 280 of the ferrule hub 232 such that the barb 284 of the ferrule hub 232 may be fully encapsulated by the over-molded lead-in tube 294. As such, the over-molded lead-in tube 294 may be molded over four side portions of the ferrule hub 232. The over-molded lead-in tube 294 may cover portions of the internal surface 286 and the external surface 288 of the ferrule hub 232. The over-molded lead-in tube 294 may partially surround the internal surface 286 of the tapered portion 290 to taper inside of the ferrule hub 14 from the termination end 282 of the ferrule hub 232 to about zero in thickness.

In one example, the distance along the axis from the third bore end 272 to termination end 282 is about 0.65 mm, and the distance the third bore end 272 to bore 295 (inner end of the epoxy tube) is about 0.35 mm. Termination end 282 defines a bore inner diameter of about 1.30 mm in the illustrated example.

The tapered portion 290 of the ferrule hub 232 has an angle $\alpha_1$. The angle cu may be about 30 degrees, although alternatives are possible. The over-molded lead-in tube 294 may be formed over the tapered portion 290 and meet at a point 298 where the over-molded lead-in tube 294 tapers to zero thickness. The inside of the ferrule hub 232 is surrounded by the over-molded lead-in tube 294 to eliminate optical fiber catch points therein. The angle $\alpha_2$ of the over-molded lead-in tube 294 inside of the ferrule hub 232 may taper from the termination end 282 to the point 298 and may be about 15 degrees+/−1 degree relative to the central axis 250.

The barb 284 of the ferrule hub 232 may be configured to function as a retention element that engages the over-molded lead-in tube 294 to help secure the over-molded lead-in tube 294 within the fiber optic connector 200, similar to barb 76. In certain examples, the retention feature may include a bump, recess, shoulder or dent that may be arranged and configured to help prevent the over-molded lead-in tube 294 from detaching. The over-molded lead-in tube 294 has an inner taper 300 from a proximal end 302 that tapers outwardly toward a distal end 304 to facilitate insertion of the buffer layer 42 of the fiber optic cable 236 into the passage 274.

As above, the epoxy needle shut off zone 292 along tapered portion 290 is downstream from point 298 where the over-molded lead-in tube 294 tapers to zero thickness.

Turning again to FIG. 26, the ferrule 144 defines a cutout 306 (e.g., recess, cavity) adapted to receive a projection 308 (e.g., bump) of the ferrule hub 232. Together the cutout 306 and the projection 308 can be arranged and configured to provide a retention feature such that the ferrule 244 and the ferrule hub 232 can be mechanically secured together.

Figure 30:
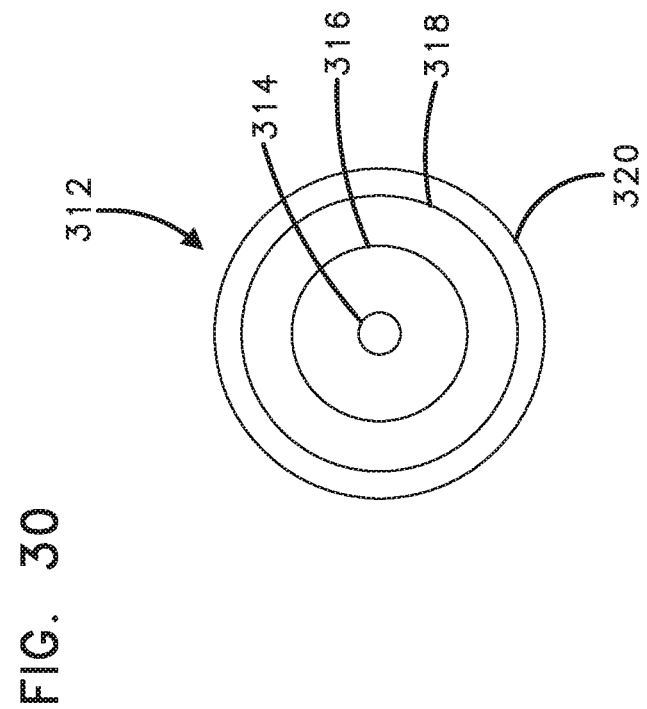
FIG. 30 is a cross-sectional view through a coated portion of the optical fiber.
Figure 29:
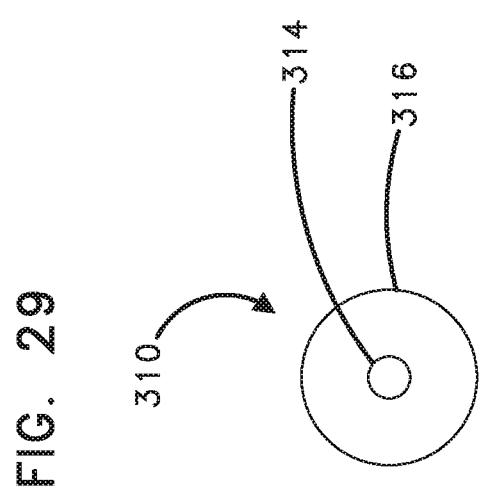
FIG. 29 is a cross-sectional view through a bare glass portion of an optical fiber of the fiber optic cable.

In certain embodiments, optical fiber 38 may include a bare glass portion 310 that extends through the fiber optic ferrule 12, ferrule hub 232 and a coated portion 312 that extends through the remainder of the fiber optic connectors 10, 200. In one example, the bare glass portion 310 can have a diameter in the range of 120-140 microns and the coated portion 312 can have a diameter greater than 230 microns. In certain examples, the bare glass portion 310 includes a core 314 (see FIG. 29) surrounded by a cladding layer 316, and the coated portion 312 includes the core 314, the cladding layer 316 and one or more coating layers 318 (see FIG. 30). The coated portion 312 can also include a loose or tight buffer tube 320 surrounding the coating layer 318 to provide additional protection. The buffer tube 320 may have an outer diameter of, for example, about 900 microns applied over the coating layer 318 and further protects the fiber. This can also be referred to as upjacketing. Although a single optical fiber 38 is depicted, it will be appreciated that more than one optical fiber 38 may be located within the buffer tube 320, such as two, four, eight, or even up to 24 optical fibers. The optical fiber 38 may be positioned loosely within the buffer tube 320 to provide a "loose-tube arrangement" or may be positioned to provide a "tight-tube" arrangement.

An inner core of a fiber optic cable may include a plurality of strength members. In one example, the plurality of strength members are fibers or yarns that completely surround the buffer tube 320. The yarns may be constructed of aramid yarns, such as those sold under the trademark of Kevlar. In certain examples, the fiber optic cable includes at least on rigid strength member within the inner core.

In one aspect, the various fiber optic connectors include a ferrule assembly including a ferrule and a hub, the ferrule having a first end and an opposite second end, the ferrule defining a fiber passage that extends between the first and second ends of the ferrule, the fiber passage being concentric with a central axis of the ferrule, with the hub mounted around the second end of the ferrule, the hub including an axial passage, the hub having a tapered inner surface portion and an outer surface portion, and the hub extending along the central axis. An over-molded lead-in tube is molded over the outer surface portion of the hub such that the over-molded lead-in tube covers the end of the hub, and the over-molded lead-in tube also being molded over a portion of the tapered inner surface portion of the hub.

In a further aspect, the tapered inner surface of the hub is used for: forming the inner end portion of the over-molded tube via the mold pin; and sealing against the epoxy needle.

In another aspect, the over-molded lead-in tube is molded over the end of the outer surface portion of the hub such that the over-molded lead-in tube covers the outer end of the hub, and the over-molded lead-in tube also being molded over a portion of the tapered inner surface portion of the hub.

In a further aspect, a portion of the end of the hub is encapsulated by the over-molded tube on four sides: 1) an inner facing portion, 2) an outer facing portion, 3) a portion facing the distal end of the connector; and 4) a further portion facing the front or proximal end of the connector.

In another aspect, the various fiber optic connectors include a ferrule assembly including a ferrule and a hub, the ferrule having a first end and an opposite second end, the ferrule defining a fiber passage that extends between the first and second ends of the ferrule, the fiber passage being concentric with a central axis of the ferrule, with the hub mounted around the second end of the ferrule, the hub including an axial passage, the hub having a tapered inner surface portion and an outer surface portion, the hub including a retention member circumferentially extending around the hub about the outer surface, and the hub extending along the central axis. An over-molded lead-in tube has a tubular shape and is molded over the outer surface portion of the hub such that the over-molded lead-in tube fully encapsulates the retention member of the hub, and the over-molded lead-in tube also being molded over the tapered inner surface portion of the hub, wherein the over-molded lead-in tube intersects the tapered inner surface portion of the hub and tapers to zero thickness along the tapered inner surface portion of the hub.

In a further aspect, the various fiber optic connectors include a ferrule assembly including a ferrule and a hub, the ferrule having a first end and an opposite second end, the ferrule defining a fiber passage that extends between the first and second ends of the ferrule, the fiber passage being concentric with a central axis of the ferrule, with the hub mounted around the second end of the ferrule, the hub including an axial passage, the hub having a tapered inner surface portion and an outer surface portion, and the hub extending along the central axis. An over-molded lead-in tube is molded over the outer surface portion of the hub such that the over-molded lead-in tube fully encapsulates the end portion of the hub, and the over-molded lead-in tube also is molded over the tapered inner surface portion of the hub, wherein the over-molded lead-in tube tapers to a zero point along the tapered inner surface portion of the hub and defines a needle shut off zone on the tapered inner surface downstream of the location where the lead-in tube tapers to zero.

In another aspect, the various fiber optic connectors include a ferrule assembly including a ferrule and a hub, the ferrule having a first end and an opposite second end, the ferrule defining a fiber passage that extends between the first and second ends of the ferrule, the fiber passage being concentric with a central axis of the ferrule, with the hub mounted around the second end of the ferrule, the hub including an axial passage, the hub having a tapered inner surface portion and an outer surface portion, and the hub extending along the central axis. An over-molded lead-in tube is molded over the outer surface portion of the hub such that the over-molded lead-in tube has a generally cylindrical exterior shape. A small taper may be applied for manufacturing. The over-molded lead-in tube also is molded over inner surface portion of the hub such that the over-molded lead-in tube has a generally cylindrical interior shape for a majority of the tube. A small taper may be applied on the interior for manufacturing. The over-molded lead-in tube covers a distal end of the hub. Optionally, a retention member maybe defined on the outer surface portion of the hub wherein the tube fully encapsulates the retention member of the hub.

Tapered lead-ins on the distal ends of the tubes may applied to facilitate needle and/or fiber insertion.

Generally, the tubes extend adjacent to the distal ends of the connector rear body portion. The tube can be just short, about equal, or extend past the distal end of the connector body.

The various examples described above are provided by way of illustration only and should not be construed to limit the scope of the present disclosure. Those skilled in the art will readily recognize various modifications and changes that may be made without following the example examples and applications illustrated and described herein, and without departing from the true spirit and scope of the present disclosure.

What is claimed is:

1. A fiber optic connector, comprising:
a ferrule assembly including a ferrule and a hub, the ferrule having a first end and an opposite second end, the ferrule defining a fiber passage that extends between the first and second ends of the ferrule, the fiber passage being concentric with a central axis of the ferrule;
the hub mounted around the second end of the ferrule, the hub including an axial passage, the hub having an inner surface portion and an outer surface portion, the hub including a retention member circumferentially extending around the hub about the outer surface, and the hub extending along the central axis, wherein the inner surface portion of the hub defines a first taper toward the central axis along a stem portion of the hub as the inner surface portion extends from a termination end of the stem portion toward the ferrule and a second taper that is also toward the central axis adjacent a fiber entry area defined at the second end of the ferrule, wherein the inner surface portion of the hub defines a non-tapered straight portion that is in between and separates the portion defining the first taper and the portion defining the second taper; and
an over-molded lead-in tube being molded over the outer surface portion of the hub such that the over-molded lead-in tube fully encapsulates the retention member of the hub, and the over-molded lead-in tube also being molded over at least a portion of the inner surface portion of the hub defining the first taper such that the portion of the over-molded lead-in tube that is molded over at least a portion of the inner surface portion of the hub extends along a majority of the inner surface portion of the hub defining the first taper and extends past the retention member in the axial direction toward the ferrule, wherein the over-molded lead-in tube tapers to zero along the inner surface portion of the hub.

2. The fiber optic connector of claim 1, wherein the retention member defines a circumferentially extending barb.

3. The fiber optic connector of claim 1, wherein the ferrule is a ceramic ferrule.

4. The fiber optic connector of claim 1, wherein the over-molded lead-in tube is constructed of a flexible plastic material more flexible than the hub.

5. The fiber optic connector of claim 1, wherein the fiber optic connector is an SC-type fiber optic connector.

6. The fiber optic connector of claim 1, wherein the fiber optic connector is a LC-type fiber optic connector.

7. A fiber optic connector, comprising:
a ferrule assembly including a ferrule and a hub, the ferrule having a first end and an opposite second end, the ferrule defining a fiber passage that extends between the first and second ends of the ferrule, the fiber passage being concentric with a central axis of the ferrule, the fiber passage of the ferrule including:
a first portion adjacent the first end of the ferrule and exposed to open at the first end of the ferrule, the first portion defining a first internal passage having a constant first cross sectional area along an entire length of the first internal passage;
a second portion positioned adjacent the first internal passage of the first portion and between the first portion and the second end of the ferrule, the second portion defining a second internal passage adjacent the first internal passage of the first portion and having a constant second cross sectional area along an entire length of the second internal passage; and
a transition area extending between a first end and an opposite second end, the first end abutting with the second portion and the second end abutting with the second end of the ferrule, the transition area having an inner diameter that continuously changes between the first end and the second end, wherein the transition area has a diameter increasing in a direction from the first portion to the second portion of the fiber passage of the ferrule; the hub mounted around the second end of the ferrule, the hub including an axial passage, the hub having an inner surface portion and an outer surface portion, and the hub extending along the central axis;
a retention member defined on the outer surface portion of the hub at a rear end thereof; and
an over-molded lead-in tube being molded over the outer surface portion of the hub such that the over-molded lead-in tube fully encapsulates the retention member of the hub, and the over-molded lead-in tube also being molded over at least a portion of the inner surface portion of the hub, wherein the over-molded lead-in tube tapers to zero along at least a portion of the inner surface portion of the hub that defines a first taper toward the central axis along a stem portion of the hub as the inner surface portion extends from a termination end of the stem portion toward the ferrule, wherein the inner surface portion of the ferrule hub also defines a second taper that is also toward the central axis adjacent a fiber entry area defined at the second end of the ferrule, wherein the inner surface portion of the hub defines a non-tapered straight portion that is in between and separates the portion defining the first taper and the portion defining the second taper, wherein the portion of the over-molded lead-in tube that is molded over at least a portion of the inner surface portion of the hub extends along a majority of the inner surface portion of the hub defining the first taper and extends past the retention member in the axial direction toward the ferrule.

8. The fiber optic connector of claim 7, wherein the over-molded lead-in tube is constructed of a flexible plastic material more flexible than the hub.

9. The fiber optic connector of claim 7, wherein the retention member defines a circumferentially extending barb.

10. The fiber optic connector of claim 1, wherein the inner surface portion of the hub defines the first taper toward the central axis along a majority of the length of the stem portion of the hub as the inner surface portion extends from the termination end of the stem portion toward the ferrule.

11. The fiber optic connector of claim 7, wherein the first taper is toward the central axis along a majority of the length of the stem portion of the hub as the inner surface portion extends from the termination end of the stem portion toward the ferrule.

* * * * *